(12) United States Patent
Liang et al.

(10) Patent No.: US 8,452,952 B2
(45) Date of Patent: May 28, 2013

(54) METHODS AND APPARATUS FOR BUILDING SYSTEM IMAGES AND SPLIT BOOTING

(75) Inventors: Mike Chih-Kang Liang, Milpitas, CA (US); Richard Junjie Chen, Beijing (CN)

(73) Assignee: Wyse Technology Inc., San Jose, CA (US)

( * ) Notice: Subject to any disclaimer, the term of this patent is extended or adjusted under 35 U.S.C. 154(b) by 226 days.

(21) Appl. No.: 12/908,854

(22) Filed: Oct. 20, 2010

(65) Prior Publication Data

US 2012/0102305 A1    Apr. 26, 2012

(51) Int. Cl.
*G06F 9/24* (2006.01)
*G06F 9/44* (2006.01)

(52) U.S. Cl.
CPC .................................. *G06F 9/4406* (2013.01)
USPC ............................................................. 713/2

(58) Field of Classification Search
USPC ............................................................. 713/2
See application file for complete search history.

(56) References Cited

U.S. PATENT DOCUMENTS

| | | | |
|---|---|---|---|
| 6,401,202 B1 | 6/2002 | Abgrall | |
| 6,477,642 B1 | 11/2002 | Lupo | |
| 7,512,719 B1 * | 3/2009 | Gillespie | 710/10 |
| 7,802,084 B2 * | 9/2010 | Fitzgerald et al. | 713/2 |
| 7,921,247 B1 * | 4/2011 | Gillespie | 710/100 |
| 2006/0242395 A1 * | 10/2006 | Fausak | 713/1 |
| 2007/0174414 A1 | 7/2007 | Song et al. | |
| 2007/0233955 A1 * | 10/2007 | Luo et al. | 711/115 |
| 2008/0046708 A1 * | 2/2008 | Fitzgerald et al. | 713/2 |
| 2008/0148031 A1 * | 6/2008 | Brown et al. | 713/1 |
| 2009/0019276 A1 * | 1/2009 | Song et al. | 713/2 |
| 2009/0019277 A1 * | 1/2009 | Song et al. | 713/2 |
| 2009/0205016 A1 | 8/2009 | Milas | |
| 2010/0146256 A1 * | 6/2010 | Luo et al. | 713/2 |
| 2010/0169629 A1 * | 7/2010 | Zhang et al. | 713/1 |
| 2011/0066837 A1 * | 3/2011 | Lee et al. | 713/2 |
| 2011/0119434 A1 * | 5/2011 | Brown | 711/103 |
| 2011/0246626 A1 * | 10/2011 | Peterson et al. | 709/220 |
| 2011/0246714 A1 * | 10/2011 | Zhou et al. | 711/112 |
| 2011/0246719 A1 * | 10/2011 | Knox et al. | 711/118 |
| 2011/0246985 A1 * | 10/2011 | Zhou et al. | 718/1 |

OTHER PUBLICATIONS

International Preliminary Report on Patentability; Application No. PCT/US11/50425; pp. 9, Nov. 2, 2012.

* cited by examiner

*Primary Examiner* — Ryan Stiglic
(74) *Attorney, Agent, or Firm* — Baker Botts L.L.P.

(57) ABSTRACT

An example of a method for facilitating split booting includes executing a base system image file of a system, initializing components of the first computing device, loading the extended system image file, and executing the extended system image file from the first computing device without booting the first computing device. The base system image file and an extended system image file of the system are built from a single executable system image file of the system. An example of a method for building system images includes building, as a single executable file, a system image file of a system and dividing the system image file into a base system image file and an extended system image file. An example of a machine-readable storage medium having code for carrying out the method, an apparatus having the machine-readable storage medium, and an apparatus having means for carrying out the method is disclosed.

22 Claims, 12 Drawing Sheets

METHODS AND APPARATUS FOR BUILDING SYSTEM IMAGES AND SPLIT BOOTING

FIELD

The subject technology relates in general to computing devices and booting, and more particularly to, methods and apparatus for building system images and split booting.

BACKGROUND

Applicant has discovered that there is a need to drive a computing device such as a thin client device to the lowest possible cost, to reduce the complexity of device hardware and to increase the system reliability, all of which can provide market competitiveness and expand the market size. One of the expensive and complex components in a thin client device is a flash unit, which is sometimes referred to as an integrated drive electronics (IDE) flash module that can emulate a hard disk. It is thus desirable to eliminate the flash unit from a computing device (particularly, from a thin client device), and at the same time, without bringing in the drawbacks of a diskless (flashless) system.

SUMMARY

In one aspect of the disclosure, a method for facilitating split booting may comprise some or all of the following: executing, from a memory of a first computing device, a base system image file of a system, wherein the base system image file and an extended system image file of the system are built from a single executable system image file of the system, wherein the base system image file comprises a first set of functions of an operating system, wherein the extended system image file comprises a second set of functions of the operating system, wherein the base system image file resides in the first computing device during the step of executing the base system image file; initializing components of the first computing device; loading the extended system image file; and executing the extended system image file from the first computing device without booting the first computing device between the step of loading the extended system image file and the step of executing the extended system image file, wherein the step of executing the extended system image file occurs after the step of loading.

In one aspect of the disclosure, a machine-readable storage medium encoded with instructions executable by a first processing system may perform a method for facilitating split booting. The instructions may comprise some or all of the code for: facilitating executing, from a memory of a first computing device, a base system image file of a system, wherein the base system image file and an extended system image file of the system are built from a single executable system image file of the system, wherein the base system image file comprises a first set of functions of an operating system, wherein the extended system image file comprises a second set of functions of the operating system, wherein the base system image file is to reside in the first computing device during the step of facilitating executing the base system image file; initializing components of the first computing device; loading the extended system image file; and facilitating executing the extended system image file from the first computing device without booting the first computing device between the step of loading the extended system image file and the step of facilitating executing the extended system image file, wherein the step of facilitating executing the extended system image file occurs after the step of loading.

In one aspect of the disclosure, a computing device may comprise some or all of the following: a first processing system; and a machine-readable storage medium comprising instructions executable by the first processing system. The instructions may comprise some or all of the code for: facilitating executing a base system image file of a system, wherein the base system image file and an extended system image file of the system are built from a single executable system image file of the system, wherein the base system image file comprises a first set of functions of an operating system, wherein the extended system image file comprises a second set of functions of the operating system; initializing components of the computing device; loading the extended system image file; and facilitating executing the extended system image file from the computing device without booting the computing device between the step of loading the extended system image file and the step of facilitating executing the extended system image file, wherein the step of facilitating executing the extended system image file occurs after the step of loading.

In one aspect of the disclosure, a computing device may comprise some or all of the following: a first processing system; a memory; means for facilitating executing, from the memory of the computing device, a base system image file of a system, wherein the base system image file and an extended system image file of the system are built from a single executable system image file of the system, wherein the base system image file comprises a first set of functions of an operating system, wherein the extended system image file comprises a second set of functions of the operating system, wherein the base system image file resides in the computing device during facilitating executing the base system image file; means for initializing components of the computing device; means for loading the extended system image file; and means for facilitating executing the extended system image file from the computing device without booting the computing device between loading the extended system image file and facilitating executing the extended system image file, wherein the facilitating executing the extended system image file is to occur after the loading.

In one aspect of the disclosure, a method for building system images to facilitate split booting may comprise some or all of the following: building, as a single executable file, a system image file of a system, wherein the system image file comprises a base portion and an extended portion, herein the base portion comprises a first set of functions of an operating system, wherein the first set of functions of the operating system comprises basic operating system functions, networking system functions, functions for abstracting and managing drawing objects, and a sign-on function, wherein the extended portion comprises a second set of functions of the operating system and one or more applications; and dividing the system image file into a base system image file and an extended system image file, wherein the base system image file comprises the base portion, and the extended system image file comprises the extended portion.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
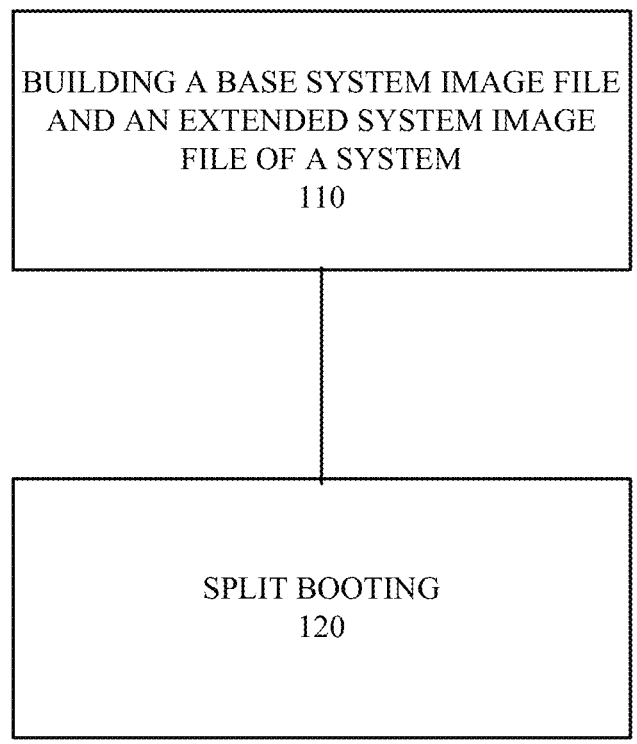
FIG. 1 is a conceptual flow diagram illustrating an example of stages of operations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Overview

An aspect of the subject technology is directed to the design of a hybrid of disk boot and diskless boot system for network based computing devices. In one aspect, this is a method that allows users to start a computing device in a slim kernel mode like a traditional disk based operating system and seamlessly switch over to a network-booted fully functional system without the overhead like a traditional diskless operating system. It offers a solution that is lower in cost and higher in performance.

Illustration of Various Approaches

One approach is to use a diskless boot system. For the diskless approach, a system starts by loading the operating system first via a network transfer protocol, such as a file transfer protocol (FTP), a trivial file transfer protocol (TFTP), a hypertext transfer protocol (HTTP), a server message block (SMB) protocol, or another network transfer protocol, then continuously uses the network to load piece by piece of the system image or application programs from network drives on a needed basis throughout the time the device (e.g., a diskless personal computer (PC)) is turned on. For example, a diskless PC may have a removable disk (e.g., a floppy disk) or a small disk (e.g., IDE disk) that contains a basic operating system such as a disk operating system (DOS), and the diskless PC may be booted from the floppy disk or the small disk that contains DOS. A network server has the full operating system and applications. However, as more and more devices are added to the operating environment, the performance degrades because the devices need to load the full operating system and applications during each power-on and reboot as described above. This approach is not a scalable solution.

A second approach is to use a network transfer protocol to transfer a full system image to the device memory and execute. In this case, a device may be running a small system image which does not contain full functionality. For the network transfer protocol approach, to load the full system at the start-up time, the system will essentially have to start up again with the full image from memory. For a display device like a thin client device, a user would unavoidably see the system activities on the display, including the start-up, display turned-on, image loading, display turned-off, start-up again and finally, display turned-on again. All these activities, including the loading of the full image, occur in foreground. It is an unpleasant process for human eyes to see screen flicking on and off as often. For example, an X-Windows device may use this second approach, and after the full image is downloaded, the device must reboot (or restart).

In the second approach described above, the full system image that is downloaded onto a client device is a brand new image and does not allow the client device to continue execution of programs. The downloaded system image provides a new environment. The downloaded system image must reset the client device because the downloaded system image cannot communicate with the system code that exists on the client device prior to the download. The system code on the client device prior to the download may include a basic input/output system (BIOS) and a small portion of an operating system, but the system code is not a complete operating system, and is not linked with the downloaded system image to communicate with the downloaded system image.

Both approaches described above have a major problem during device start-up while loading its full system image. The network becomes congested and negatively affects all networking activities.

Illustration of Phrases

In one aspect, a phrase "base system image file" may refer to a base system image or a base image. In one aspect, a base system image file may comprise a base portion of a system.

In one aspect, a phrase "extended system image file" may refer to an extended system image or an extended image. In one aspect, an extended system image file may comprise an extended portion of a system.

In one aspect, a phrase "facilitating" an action may refer to an act that may help to perform the action. In one aspect, it may refer to an act that may initiate the action. In one aspect, it may refer to an act that may help complete the action. In one aspect, it may refer to the action itself.

In one aspect, "facilitating executing a base system image file" may be performed by a piece of code in the base system image file. In another aspect, "facilitating executing a base system image file of a system" may be performed by another code such as BIOS.

In one aspect, "facilitating executing an extended system image file" may be performed by a piece of code in a base system image file (e.g., a function in the base system image file that can call a subroutine in the extended system image file), or it may refer to a representation (e.g., a link) in the base system image file that can help initiate executing a function in the extended system image file. In another aspect, "facilitating executing an extended system image file" may be performed by a piece of code in the extended system image file.

In one aspect, a phrase "executing a base system image file" may refer to "executing one or more functions in a base system image file." In one aspect, a phrase "executing an extended system image file" may refer to "executing one or more functions in an extended system image file."

In one aspect, a module may be one or more functions, one or more subroutines, or code encoded on a machine-readable medium.

Illustration of Various Advantages

In accordance with one aspect of the disclosure, the subject technology can provide, among others, the following advantages.

In one advantageous aspect, a base system image file of a system, which is a first part of a system image, (e.g., slim kernel) is stored in a non-volatile memory of a computing device (e.g., the boot read-only memory (ROM)). Since a boot ROM chip is a required part on a system board and no other storage device is required, this reduces the cost of the computing device and hardware complexity.

In one advantageous aspect, a base system image (e.g., slim kernel) executes its first task to prompt a user to sign on with the user's credential, while the base system image loads an extended system image file of the system (e.g., the second part of the system image). The extended system image file may contain application programs that run on top of the first part of the system image (e.g., slim kernel), and the loading occurs in background, so the user is unaware of the network loading of this extended system image.

In one advantageous aspect, after a user signs on to the system, all available resources loaded from the extended system image may be presented to the user. The system is now running in a fully functional mode without the negative effect of having a distinct stage of network booting.

In one advantageous aspect, the subject technology avoids the reloading of the system from a network server on next boot. Because all the system data are either in ROM or already loaded to a read/write memory (RAM), the system will restart from the initial loaded copy as long as the power cord is not unplugged from the computing device. The system retains the memory content using an appropriate method of power management while the system is in the shutdown stage. For subsequent reboot of the computing device, the system executes from the image already transferred into RAM. Therefore, no network bandwidth is consumed. Consequently, the system restarts much faster without the network transfer delay like the other network booting devices used for other approaches described above.

In one advantageous aspect, the subject technology can avoid the drawbacks of the first approach described above (e.g., eliminate continuous network usage) and the second approach described above (e.g., avoid flicking of the screen), and the subject technology can eliminate a flash unit.

In one advantageous aspect, a base system image file of a system is stored on a ROM chip of a target computing device where BIOS is stored, and the extended system image file of the system (or the entire system image including the base system image file and the extended system image file) is stored on another computing device (e.g., a server on a network). After the base system image file is loaded onto a RAM of the target computing device, the base system image file may execute. The base system image file may then initialize the system and load the extended system image file from the other computing device in background during sign on. The system on the target computing device (the base system image file plus the extended system image file) will then represent a full system.

Illustration of Various Features

According to one illustration, an aspect of the subject technology may include, among others, some or all of the following features:

In one aspect, a base system image (e.g., slim kernel) on a memory (e.g., ROM chip) of a computing device may load the extended system image of the system to RAM of the computing device.

In one aspect, the extended system image from a network server needs to be loaded only once until the computing device's power is removed (e.g., the power cord is unplugged).

In one aspect, the system of the computing device may start from the memory of the computing device (e.g., RAM) during reboot.

According to one aspect of the disclosure, the subject technology may include, among others, some or all of the following features:

In one aspect, a base portion (e.g., slim kernel) of a system and an extended portion (e.g., extended system image) of the system may be compiled and linked as a single executable file (e.g., one single program file). The single executable file may then be divided into two parts. The first part—the base portion—may contain certain operating system functions to handle hardware and provide system services to application tasks. The second part—the extended system image—may contain all application tasks that a user may invoke. The first part—the base portion—residing on a memory (e.g., a ROM chip) of a computing device may download the second part—the extended system image—into a memory (e.g., RAM) of the computing device just once, and may download the extended system image while a prompt for a user's credential is displayed so that the system does not appear to be network booting to the user. In one example, the size of a ROM may be, for example, 1 MB or 2 MB. In one aspect, the size of a RAM may be, for example, 256 MB, 1 GB or 2 GB. These are examples, and the subject technology is not limited to these examples.

In one aspect, from the user's perspective, the system appears running from a local flash. The user does not see the network loading of the extended system image because the loading occurs behind the scene (in the background), and because the system does not need to restart after the loading of the extended system image is completed. On subsequent system reboots, the system may restart from the memory copy of the full system image (e.g., the base portion and the extended portion). Therefore, it performs faster even compared to a local disk booting.

Building System Images and Split Booting

Now referring to FIG. 1, according to one aspect of the disclosure, the subject technology may include methods and apparatus for building a base system image file and an extended system image file of a system (110) and split booting (120).

Building System Images

Figure 2:
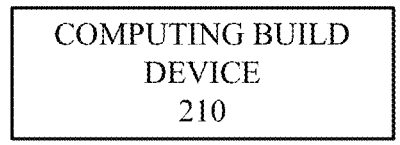
FIG. 2 illustrates an example of a computing build device.
Figure 3:
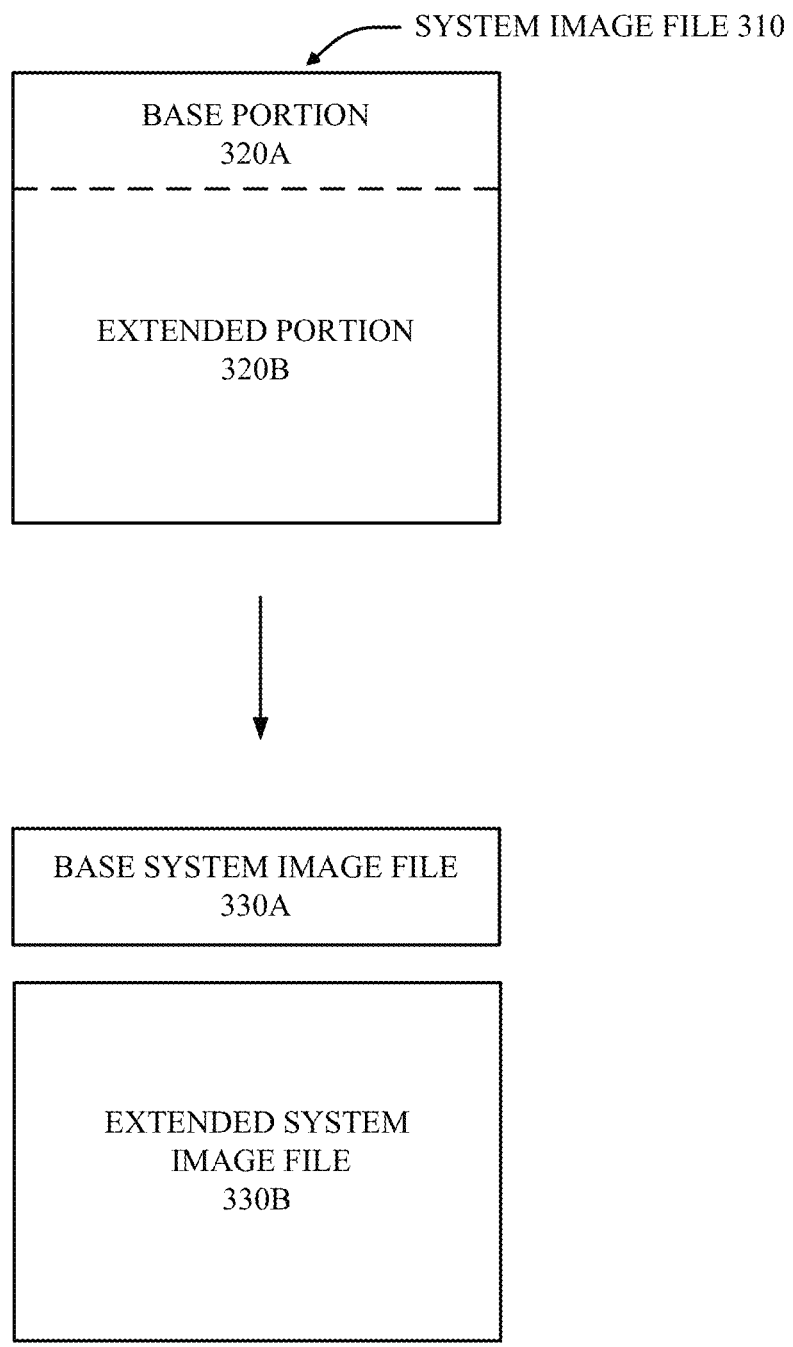
FIG. 3 illustrates an example of a system image file.
Figure 4:
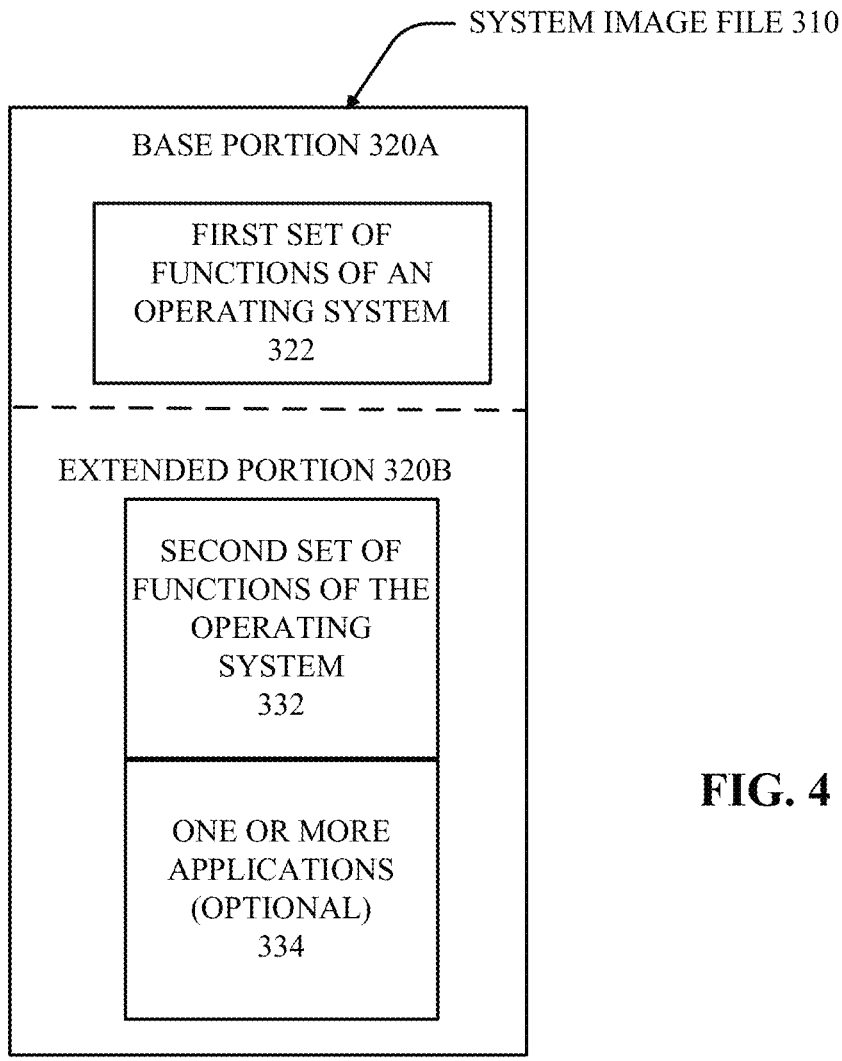
FIG. 4 illustrates an example of a system image file.

Now referring to FIGS. 2, 3 and 4, an example of a method and apparatus for building a base system image file and an extended system image file of a system (e.g., operation 110 in FIG. 1) is described.

A computing build device 210 (e.g., a computer) may start up just like a standard operating system. The system of the device 210 may initialize hardware and input/output (I/O) devices and execute applications locally on the device 210. The system may be compiled and linked into a system image file 310 as a single executable. With careful partitioning of the system image file 310 during this build process, all the base functions for initializing the hardware and software operating environment may be located in the base portion 320A of the system image file 310 (i.e., the first part of the single system image). An extended portion 320B of the system image file 310 (i.e., the other part of the single system image) may contain all the applications that run under the system.

The system image file 310, which may be a full system image, may then be split into two files. For example, the single system image file 310 may be logically split into two parts. The first part may be called a base system image file 330A, and the other part may be called an extended system image file 330B.

In one advantageous aspect, the system image file 310 may consist entirely of a base portion 320A and an extended portion 320B. In one advantageous aspect, a base system image file 330A may consist entirely of a base portion 320A, and an extended system image file 330B may consist entirely of an extended portion 320B.

In another aspect, the system image file 310 may comprise a base portion 320A, an extended portion 320B and other functions and/or applications. In one aspect, a base system image file 330A may comprise a base portion 320A and other functions and/or applications, and an extended system image file 330B may comprise an extended portion 320B and other functions and/or applications.

In one aspect, a base portion 320A may comprise a first set of functions 322 of an operating system (as shown in FIG. 4). In one example, a first set of functions of an operating system may comprise basic operating system functions, networking system functions, graphics windowing system functions such as functions for abstracting and managing drawing objects, and a sign-on function. Stated in another way, a first set of functions of an operating system may comprise functions of a basic operating system, a networking stack, a display driver, a graphics windowing system and a sign-on task. In another example, a first set of functions may comprise basic system functions, including device drivers, task schedulers, windowing system and networking. In one advantageous example, a base portion 320A may be small (e.g., less than 1 MB).

In one aspect, a basic operating system may include, for example without limitation, task scheduling and memory management. A networking system may include, for example without limitation, an Ethernet device driver and a transmission control protocol/Internet protocol (TCP/IP) software stack. A display driver may include, for example without limitation, a driver to draw graphics data on a monitor. A windowing system may include, for example without limitation, subroutines for abstracting and managing drawing objects such as windows, buttons, list boxes, menus etc.

In one advantageous aspect, a base portion 320A may include only a minimum portion of an operating system sufficient to start a computing device (e.g., a target computing device) in a graphical environment. For example, a base portion 320A may include enough functions to initialize the devices (e.g., mouse, keyboard, display) of a computing device, to display a window, to display a desktop, to load and initialize network drivers. A base portion 320A may also include functions sufficient to display a log-on window. In one aspect, a base portion 320A may not need any other functions.

In one aspect, a target computing device may be a computing device onto which a base system image file is to be copied, and an extended system image file is to be loaded.

In one aspect, a base portion 320A may have functions sufficient to initialize hardware of a computing device (e.g., a target computing device) and provide an environment for application(s) or another task(s) to start. In other words, a base portion 320A may have functions to initialize hardware so that an application(s), such as a remote access program (e.g., a remote desktop protocol (RDP) program or an independent computing architecture (ICA) program), a web browser, a word application, a drawing application, etc., can run.

In one aspect, an extended portion 320B may comprise a second set of functions 332 of the operating system (as shown in FIG. 4). The extended portion 320B may further comprise one or more applications 334 (e.g., a spreadsheet application, a word application, a multimedia application, etc.). In one aspect, an extended portion 320B may comprise a connection manager and a remote desktop protocol application (e.g., RDP or ICA application). An extended portion 320B may comprise functions of thin-client application tasks that allow a computing device (such as a terminal device or thin client) to connect to another computing device (such as a server on a network) having, for example, Windows system via RDP or ICA protocols.

In one aspect, linking of a base portion 320A and an extended portion 320B is described below. For instance, if a system image file 310 contains 100 functions, of which 30 functions are in a base portion 320A, and 70 functions are in an extended portion 320B. These functions are linked during the build process. During the build process, a computing build device 210 of FIG. 2 may determine the memory structure of a target computing device. For example, by discovering the configuration of the target computing device, the computing build device 210 may determine the memory architecture of the target computing device. The computing build device 210 may also determine the memory addresses, of the target computing device, associated with the functions in the base portion 320A and the functions in the extended portion 320B.

During the process of split booting (which will be described below), the memory addresses determined during the build process are used to load the extended portion 320B of the extended system image file 330B onto the proper memory address locations, of the target computing device, that are linked with the base portion 320A. During the split booting process, the functions of the base portion 320A (e.g., the 30 functions described above) may be first loaded onto a ROM of the target computing device. After the base portion 320A is copied onto a RAM of the target computing device from the ROM, the extended portion 320B (e.g., the 70 functions described above) may be loaded onto the predetermined memory locations (e.g., predetermined memory locations of the RAM) of the target computing device so that the function(s) of the base portion 320A and the function(s) of the extended portion 320B are linked together, and may work properly together without rebooting of the target computing device.

In one aspect, a computing build device may determine the memory locations of a ROM of the target computing device onto which the function(s) of the base portion 320A may be loaded, the memory locations of a RAM of the target computing device onto which the function(s) of the base portion 320A may be copied from the ROM, and the memory locations of a RAM of the target computing device onto which the function(s) of the extended portion 320B may be loaded. In one example, a base portion 320A may occupy 1 MB of ROM, and an extended portion 320B may occupy 9 MB of RAM. These are examples, and the subject technology is not limited to these examples.

A computing build device may generate one set of a base system image file and an extended system image file for the same type of computing devices. Computing devices of the same type may have the same size of memory or different sizes of memory. Computing devices of the same type may typically have the same type of network card, but may have different types. Computing devices of the same type may typically have the same motherboard and the same type of processing system (central processing unit (CPU)). A computing build device may be the same type, or a different type, of machine as the target computing devices.

For Wyse's computing devices, there may be one set, of a base system image file and an extended system image file, for each class. For example, there may be one set for each of the C-class (C10LE, C30LE, C50LE) and one set for each of the V-class (V10L, V30LE, V50LE). The operating systems of C10LE, C30LE and C50LE are different, and the operating systems of V10L, V30LE, V50LE are different. C10LE is a thin client computing device using Wyse's thin client operating system. C30LE is a thin client computing device using Windows CE. C50LE is a thin client computing device using Linux. V10L is a thin client computing device using Wyse's thin client operating system. V30LE is a thin client computing device using Windows CE. V50LE is a thin client computing device using Linux.

Split Booting

Figure 5:
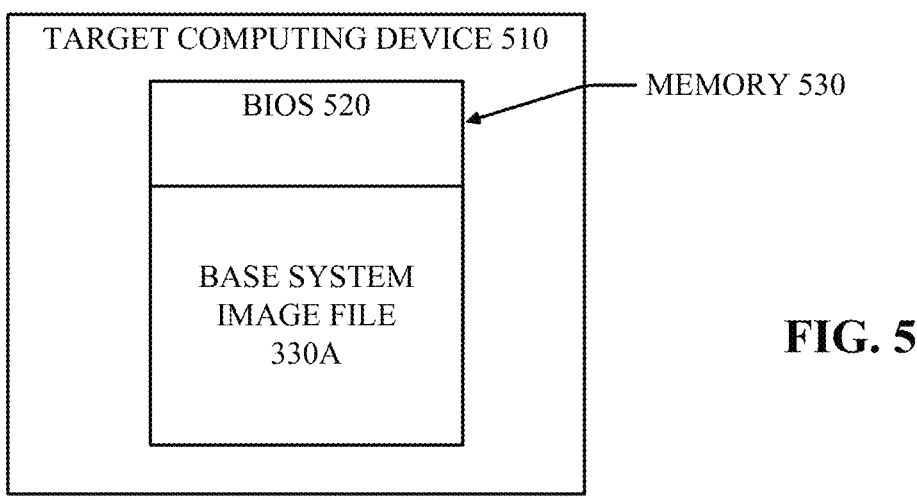
FIG. 5 illustrates an example of a target computing device.
Figure 6:
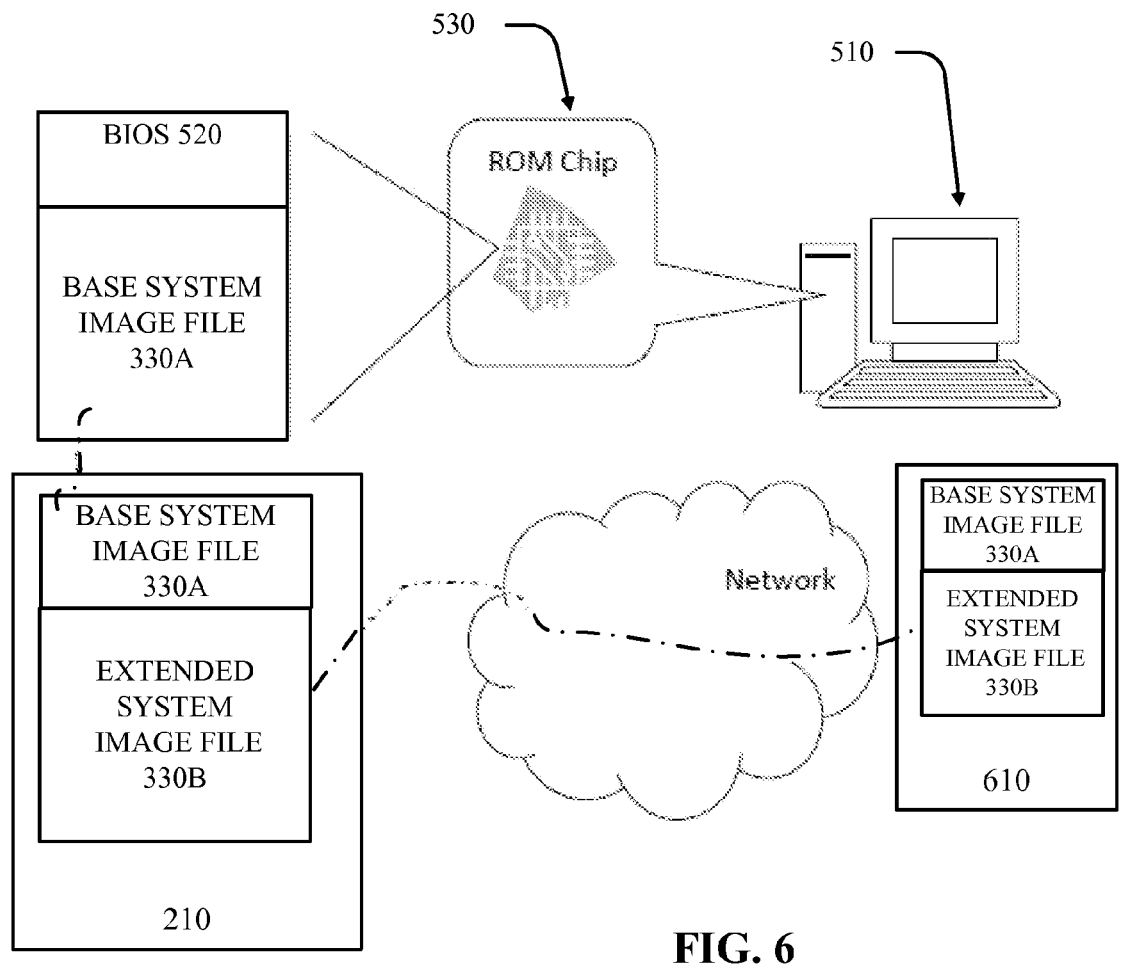
FIG. 6 illustrates an example of a target computing device, a computing build device and a server.

Now referring to FIGS. 5 and 6, an example of an operation of split booting (e.g., operation 120 in FIG. 1) is described according to one aspect of the disclosure. When a target computing device 510 is a personal computer (PC) type of device, it may comprise a memory 530 (e.g., a ROM or EPROM chip), and the memory 530 may comprise a basic input/output system (BIOS) 520. A base system image file 330A may be burnt into the memory 530 (e.g., the EPROM chip) at a location, for example, after BIOS 520. In other words, a base system image file 330A may be programmed into a ROM chip on a mother board of a target computing device. The base system image file 330A may then be copied to a RAM by BIOS, and BIOS may then pass the control to the base system image file 330A to execute the functions in the base system image.

When the target computing device 510 is Wyse's COO device (e.g., C10LE, C30LE, C50LE), an EPROM chip may contain, for example without limitation, two megabytes (2 MB), including 1 MB of BIOS and 1 MB of a base system image file. When the target computing device 510 is powered up, BIOS may execute first, and the base system image may execute next.

When a target computing device 510 is a non-PC type of device, a base system image file may occupy the entire memory (ROM or EPROM chip). In this case, there is no BIOS in the memory. When the target computing device is powered up, the base system image file may execute.

An extended system image file 330B may be stored on another computing device (such as a server 610 on a network as shown in FIG. 6). In another example, a base system image file 330A as well as an extended system image file 330B may be stored on the other computing device (such as a server 610 on a network).

In one aspect, the process of loading BIOS 520 and a base system image file 330A onto a memory (e.g., ROM) of a target computing device 510 and storing an extended system image file (and optionally a base system image file) onto another computing device (e.g., 610) may be considered to be a part of the operation 110 of FIG. 1 of building a system image file and an extended system image file, instead of being a part of the operation 120 of split booting, as described above.

Figure 7:
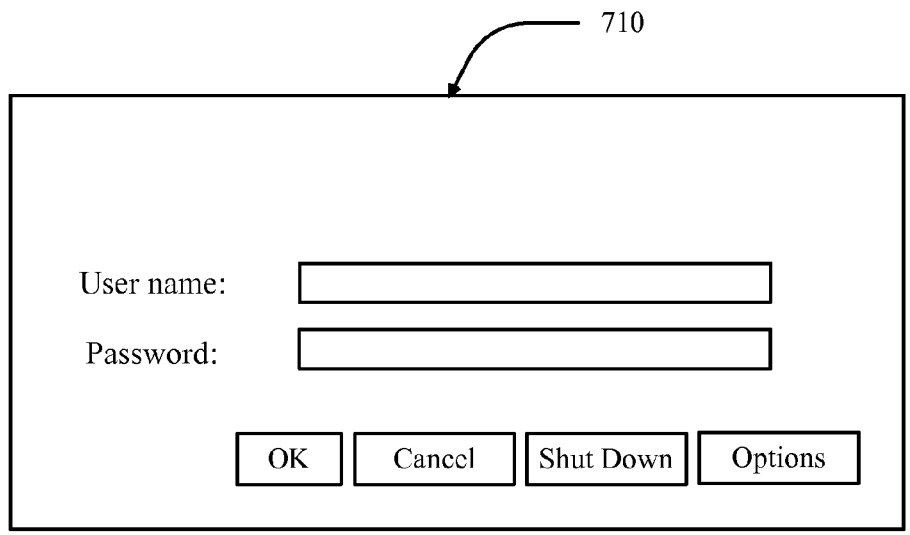
FIG. 7 illustrates an example of a sign on window.
Figure 8:
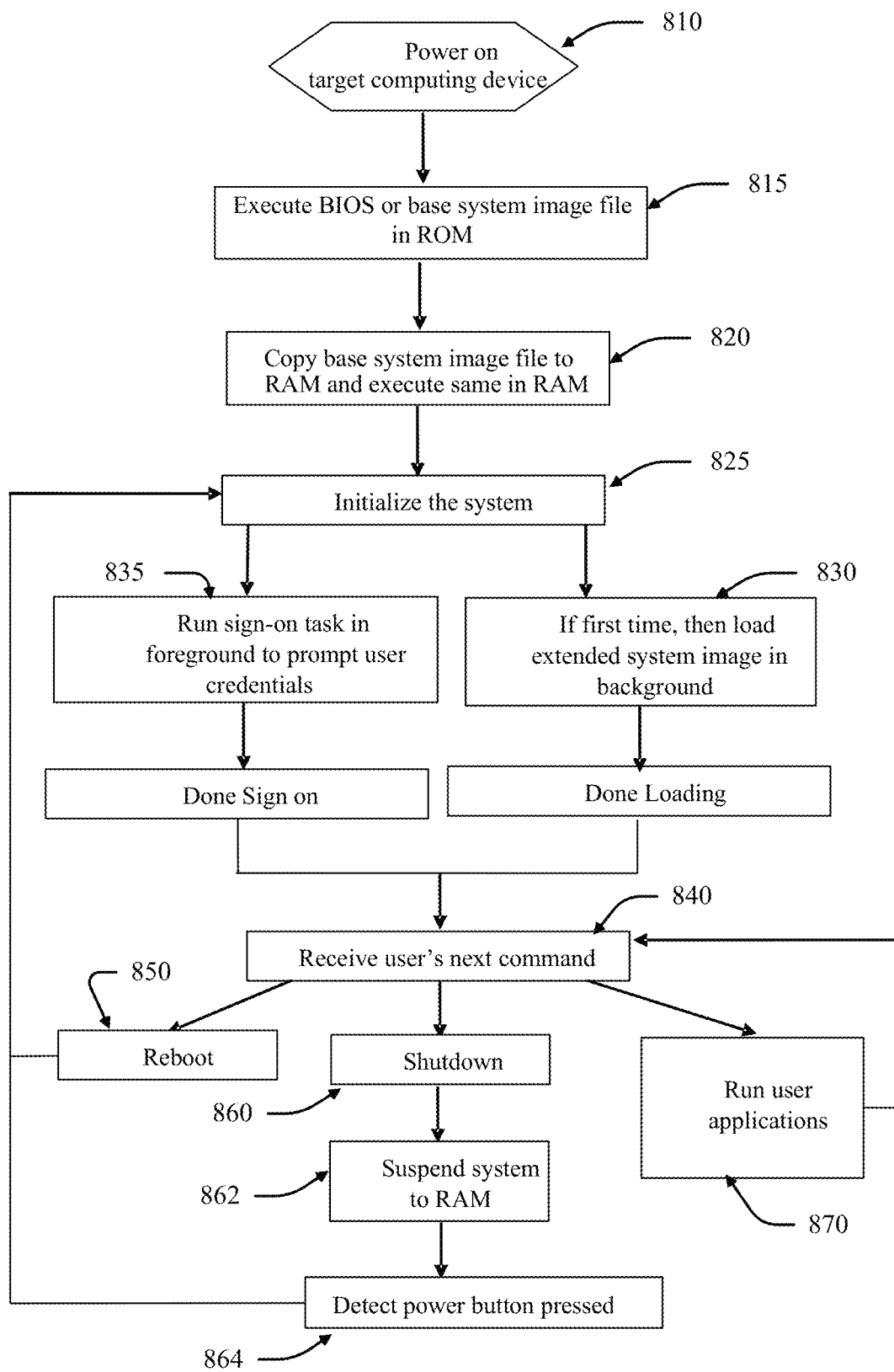
FIG. 8 is a flow chart illustrating an example of an operation of split booting.

After a base system image file on the target computing device finishes initializing input/output I/O devices (including networking) and the graphics windowing system of a target computing device, the base system image file 330A may display a sign-on window 710 to prompt a user to log on, as illustrated in FIG. 7. At the same time, an extended system image file 330B of the system may be transferred to the memory 530 of the target computing device (e.g., RAM) at the memory address where the extended system image is linked at.

At the end of transfer of an extended system image file 330B, the target computing device may be fully functional. In an advantageous aspect of the disclosure, the subject technology requires no secondary stage of booting. The system of the target computing device (including a base system image file 330A and an extended system image file 330B) may boot as if the system is one single image booted from a single boot device. Loading and executing the extended system image file may complete the system and network initialization. After the extended system image file 330B is loaded, additional applications may be downloaded.

In one aspect of the disclosure, initially, one boot chip on a target computing device may contain a base system image file 330A, and an extended system image file 330B may reside on another computing device (e.g., a server over a network) while the base system image file is being executed on the target computing device. An aspect of the subject technology may eliminate the cost of a large booting device (such as a hard disk) on a computing device that typically exists in traditional local-booting. Furthermore, an aspect of the subject technology can eliminate a second reboot that is required in traditional network-booting. In one aspect, a system comprising a base system image file 330A and an extended system image file may run directly on a computing device such as a personal computer (PC).

In one advantageous aspect, a base system image stays in control, and there is no other booting process.

The second approach described above (i.e., the TFTP/FTP approach) is a process to read in the full system image, and restart the system initialization. In other word, if the system code that exists on a computing device were to invoke a full network booting, the system code would need to read in the full system image, and give up the control to re-start the computing device and to execute the newly loaded full system image.

In one advantageous aspect, since a base system image on a target computing device is a fully functional operating system, the base system image does not need to wait for an extended system image to be downloaded, and the extended system image can be downloaded in the background.

In one advantageous aspect, a base system image includes a sign-on task so that while a sign-on window is displayed for a user to enter its credential in the foreground, an extended system image file may be downloaded in the background without the user's awareness of the download.

In one advantageous aspect, a base system image (or a base portion) can allow the subject technology to avoid the second booting required by the second approach described above (i.e., the TFTP/FTP approach) because the base system image is built as part of the original single system image file 310 (single executable). In one aspect, the base system image only needs to copy an extend system image (or an extended portion) into the correct memory location of a target computing system where the base system image resides, and then the base system image and the extended system image can be combined into a system image (like the original system image file 310), and the combined system image can continue to execute from where it was last executed. In one aspect, there is no need to load the entire system image, and there is no need to execute from the beginning of the system image.

In one advantageous aspect, the subject technology may need to boot up only once, and there is no need to re-initialize the system (or the computing device) after loading an extended system image file. To a user, loading of an extended system image file is not detectable because the loading can occur in the background.

Now referring to FIGS. 5, 6, 7, 8 and 9, an example of a sequence of steps that may occur during split booting (e.g., operation 120 in FIG. 1) is illustrated. At step 810, a target computing device (e.g., 510 in FIGS. 5 and 6) is powered on. The target computing device may already have a base system image file (e.g., 330A) as well as BIOS (e.g., 520 in FIG. 5) stored on a non-volatile memory (e.g., ROM 530) of the target computing device.

After step 810, BIOS or a base system image file may execute first at step 815. In a configuration utilizing a typical personal computer (e.g., having an Intel central processing unit (CPU)), a slim kernel in a ROM may execute at step 815. A configuration utilizing an advanced reduced-instruction-set-computing (RISC) machine typically does not employ BIOS, and thus such a system may execute a base system image file at step 815.

At step 820, BIOS may copy the base system image file in the non-volatile memory to a volatile memory (e.g., RAM) of the target computing device. The base system image file in the volatile memory may execute.

At step 825, the base system image may initialize various hardware components of the target computing device. For example, the base system image may initialize the system hardware components of the target computing device, may initialize the display windowing subsystem of the target computing device, and may initialize the networking subsystem of the target computing device.

At step 830, the base system image may determine whether it is the first time (e.g., determine whether an extended system image file is already loaded onto the target computing device). If it is the first time (e.g., there is no extended system image file in a memory of the target computing device), then the base system image may start the task of transferring an extended system image file from another computing device (e.g., a server 610) to a volatile memory (e.g., RAM) of the target computing device in background.

At step 835, the base system image may display a sign-on window (e.g., 710 in FIG. 7) in the foreground for a user to enter its credential. After the user enters the credential to login, the base system image may wait if necessary for the background task of transferring the extended system image file to complete. In one advantageous aspect, step 830 starts before step 835. In another aspect, step 835 occurs concurrently with step 830. In another aspect, step 830 may start after step 835.

Once the transfer of the extended system image file completes, all the system functions or tasks may be ready to run without rebooting of the target computing device. The system (i.e., the complete system image including the base system image and the extended system image) may give the user a variety of tasks to select (e.g., a list of applications to select from in the form of icons on the desktop, or in the form of start menu). When the system (i.e., the complete system image including the base system image and the extended system image) receives the user's next command at step 840 (without rebooting), depending on the command, the system may perform one or more tasks.

For example, if the command is to reboot the target computing device, the system may reboot the target computing device at step 850. The operation may continue to step 825. If the command is to shutdown the target computing device, the system may shutdown the system at step 860 and suspend the system (the base system image as well as the extended system image) on the volatile memory (RAM) of the target computing device at step 862. As long as power is supplied to the target computing system, the base system image as well as the extended system image are retained on the volatile memory. If the system (the base system image, the extended system image or a combination of both) determines that the system is to restart (e.g., detecting that the power button is pressed at step 864), the system may restart using the base system image and the extended system image stored on the volatile memory. The operation may continue to step 825. If the command is to run one or more applications (e.g., a user clicks on a word application icon on the desktop), then the system will run the application at step 870 (e.g., initiate execution of the word application).

Illustration of System

Figure 10:
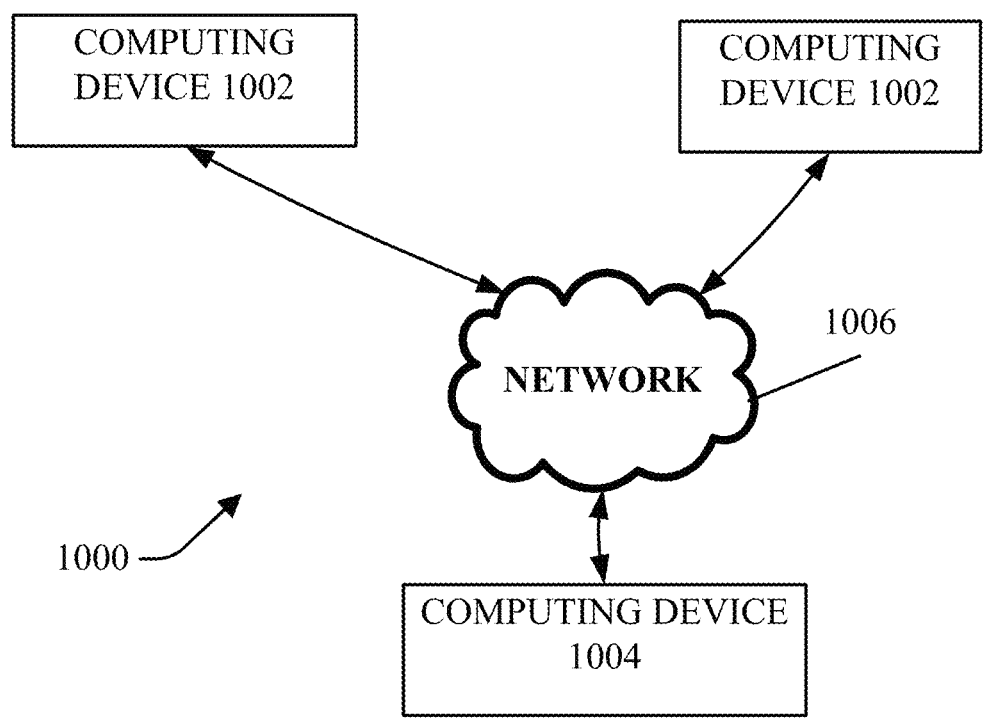
FIG. 10 illustrates a simplified diagram of an example of a computer network system.

FIG. 10 illustrates a simplified diagram of a computer network system in accordance with an aspect of the present disclosure.

A computer network system 1000 may include one or more computing devices 1002 (e.g., client devices) in communication with a computing device 1004 (e.g., a server) via a network 1006. In one aspect, the computing device 1004 is configured to allow remote sessions (e.g., remote desktop sessions) wherein users can access applications and files on the computing device 1004 by logging onto the computing device 1004 from a computing device 1002. Such a connection may be established using any of several well-known techniques such as the remote desktop protocol (RDP) on a Windows-based server.

In one aspect of the disclosure, a computing device 1002 may be a target computing device (e.g., 510 in FIGS. 5 and 6). In another aspect, a computing device 1002 may be a computing build device (e.g., 210 in FIG. 2). In one aspect, a computing device 1004 may be a computing device 610 in FIGS. 6 and 9. In another aspect, a computing device 1004 may be a computing build device (e.g., 210).

By way of illustration and not limitation, a computing device 1002 can represent a computer, a mobile phone, a laptop computer, a thin computing device, a personal digital assistant (PDA), a portable computing device, a virtual machine, or a suitable device with a processor. In one example, a computing device 1002 is a smartphone (e.g., iPhone, Android phone, Blackberry, etc.). In certain configurations, a computing device 1002 can represent an audio player, a game console, a camera, a camcorder, an audio device, a video device, a multimedia device, or a device capable of supporting a connection to a remote computing device. In one example, a computing device 1002 can be mobile. In another example, a computing device 1002 can be stationary. In one example, a computing device 1002 may be a device having at least a processor and memory, where the total amount of memory of the computing device 1002 could be less than the total amount of memory in a computing device 1004. In one example, a computing device 1002 does not have a hard disk. In one advantageous example, a computing device 1002 does not have a flash unit. In one aspect, a computing device 1002 has a display smaller than a display supported by a computing device 1004. In another aspect, a computing device 1002 has a display larger than a display supported by a computing device 1004. In one aspect, a computing device may include one or more computing devices. In one aspect, each of the computing devices 1002 may be the same (e.g., the same system configurations and the same network component configurations) or different (e.g., different system configurations or different network component configuration).

In one aspect, a computing device 1004 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a computing device 1004 can be stationary. In another aspect, a computing device 1004 can be mobile. In certain configurations, a computing device 1004 may be any device that can represent a computing device. In one aspect, a computing device 1004 may include one or more computing devices.

In one example, a first device is remote to a second device when the first device is not directly connected to the second device. In one example, a first remote device may be connected to a second device over a communication network such as a Local Area Network (LAN), a Wide Area Network (WAN), and/or other network.

When a computing device 1002 and a computing device 1004 are remote with respect to each other, a computing device 1002 may connect to a computing device 1004 over a network 1006, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 1006 can be a LAN network, a WAN network, a wireless network, the Internet, an intranet or other network. A network 1006 may include one or more routers for routing data between computing devices. A remote device (e.g., computing device, computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

In one aspect, the terms "local" and "remote" are relative terms, and a computing device may be referred to as a local computing device or a remote computing device, depending on whether a computing device is on one side of a network or on another side of the network.

Illustration of Computing Device

Figure 11:
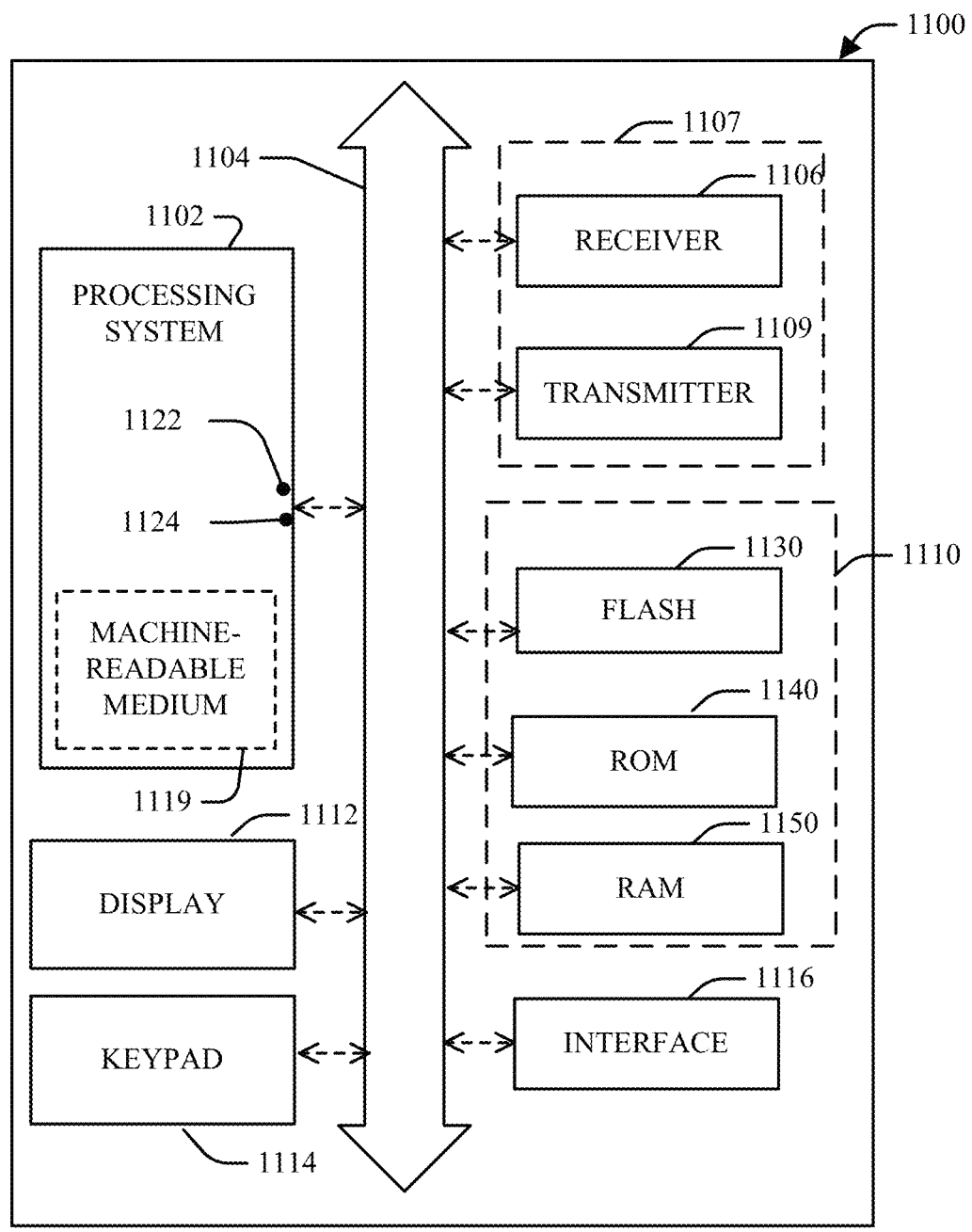
FIG. 11 is a conceptual block diagram illustrating an example of a computing device.

FIG. 11 is a conceptual block diagram illustrating an example of a computing device.

Figure 9:
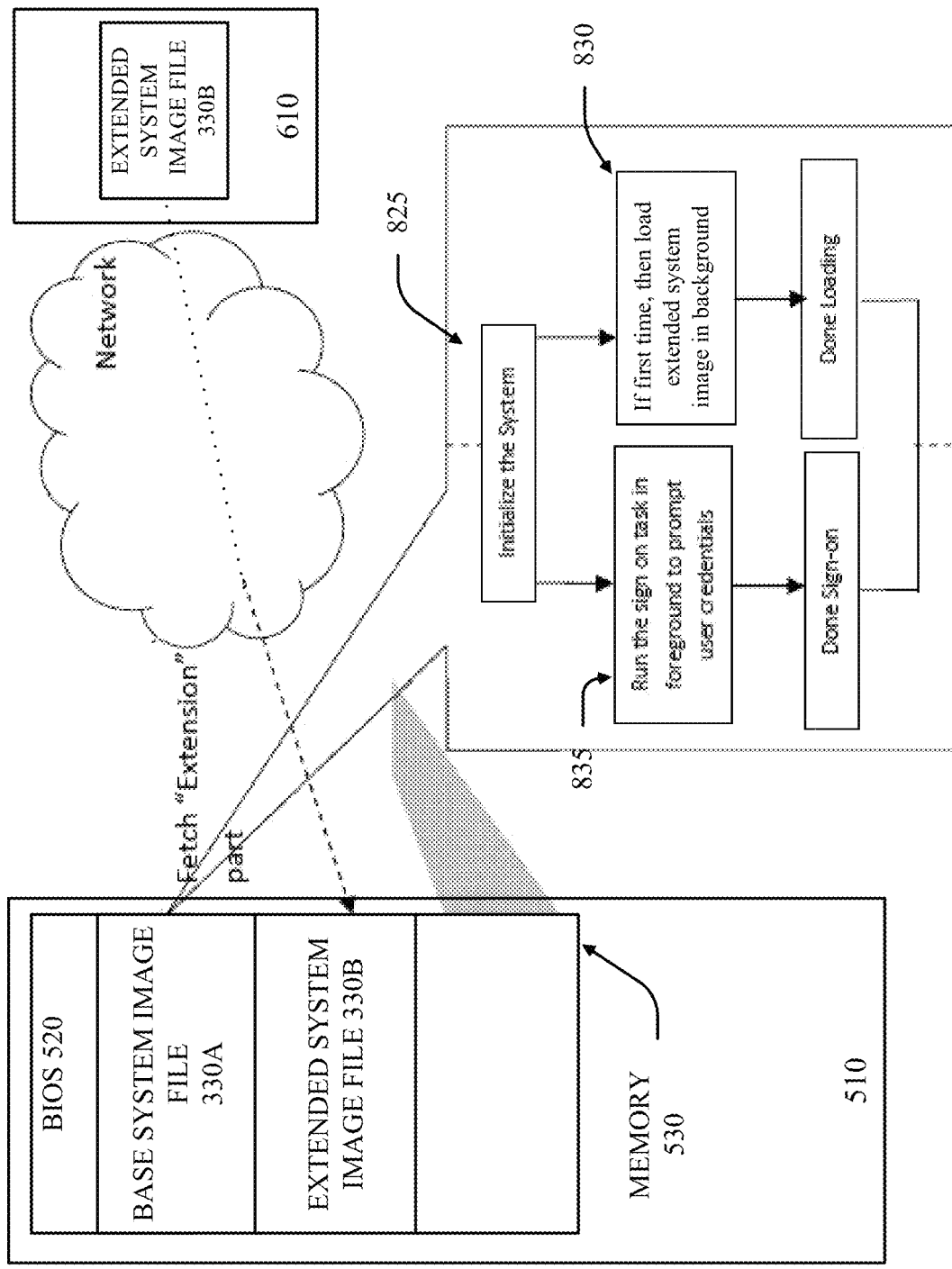
FIG. 9 is a conceptual diagram illustrating an example of an operation of split booting.

A computing device 1100 may be, for example, a target computing device (e.g., 510 in FIG. 5 or 6), a computing device 1002 or 1004 in FIG. 10, a server 610 in FIG. 6 or 9, or a computing build device (e.g., 210 in FIG. 2).

A computing device 1100 may include a processing system 1102. The processing system 1102 is capable of communication with a receiver 1106 and a transmitter 1109 through a bus 1104 or other structures or devices. It should be understood that communication means other than busses could be utilized with the disclosed configurations. The processing system 1102 can generate audio, video, multimedia, and/or other types of data to be provided to the transmitter 1109 for communication. In addition, audio, video, multimedia, and/or other types of data can be received at the receiver 1106, and processed by the processing system 1102.

The processing system 1102 may include a general-purpose processor or a specific-purpose processor for executing instructions and may further include a machine-readable medium 1119 for storing data and/or instructions for software programs. The instructions, which may be stored in a machine-readable medium 1110 and/or 1119, may be executed by the processing system 1102 to control and manage access to the various networks, as well as provide other communication and processing functions. The instructions may also include instructions executed by the processing system 1102 for various user interface devices, such as a display 1112 and a keypad 1114. The processing system 1102 may include an input port 1122 and an output port 1124. Each of the input port 1122 and the output port 1124 may include one or more ports. The input port 1122 and the output port 1124 may be the same port (e.g., a bi-directional port) or may be different ports.

The processing system 1102 may be implemented using software, hardware, or a combination of both. By way of example, the processing system 1102 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information. Those skilled in the art will recognize how best to implement the described functionality for the processing system 1102.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

A machine-readable medium (e.g., 1110) may include storage external to a processing system and may include a volatile memory such as a Random Access Memory (RAM) 1150, a non-volatile memory such as a flash memory 1130, a non-volatile memory such as a Read Only Memory (ROM) 1140. A ROM may be, for example without limitation, a Programmable Read-Only Memory (PROM) or an Erasable PROM (EPROM). A RAM may include registers. A machine-readable medium may also include a hard disk, a removable disk, a CD-ROM, a DVD, or any other suitable storage device. A machine-readable medium 1119 may also have a volatile memory and a non-volatile memory. A machine-readable medium 1119 may include storage integrated into a processing system, such as might be the case with an ASIC. A memory may be a machine-readable medium (e.g., 1110 or 1119) or a part thereof.

If a computing device 1100 is a target computing device (e.g., 510), then it is advantageous not to have a flash memory (e.g., 1130) on the computing device to reduce the cost of the computing device. In one example, a target computing device contains no flash memory. In another example, a target computing device contains no flash memory and no hard disk, removable disk, CD-ROM, or DVD. In one example, a target computing device's machine-readable medium contains only one or more ROMs and one or more RAMs.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a machine-readable storage medium. Instructions may be executable, for example, by a computing device (e.g., a target computing device, a computing build device or another computing device) or by a processing system of a target computing device, a computing build device or another computing device. Instructions can be, for example, a computer program including code. In one aspect, a machine-readable medium is a non-transitory machine-readable storage medium or a non-transitory computer-readable storage medium.

Interfaces or interface cards 1116 may be any type of interface and may reside between any of the components shown in FIG. 11. An interface 1116 may also be, for example, an interface to the outside world (e.g., a network interface card or an Internet network interface card). There may be one or more interfaces or interface cards 1116. A transceiver block 1107 may represent one or more transceivers, and each transceiver may include a receiver 1106 and a transmitter 1109. A functionality implemented in a processing system 1102 may be implemented in a portion of a receiver 1106, a portion of a transmitter 1109, a portion of a machine-readable medium 1110, a portion of a display 1112, a portion of a keypad 1114, or a portion of an interface 1116, and vice versa. In one aspect, a computing device may include only some or all of the elements shown in FIG. 11. A computing device may include other elements not shown in FIG. 11. A computing device may include more than one of the same elements.

Illustration of Method for Split Booting (Described as Clauses)

Figure 12A:
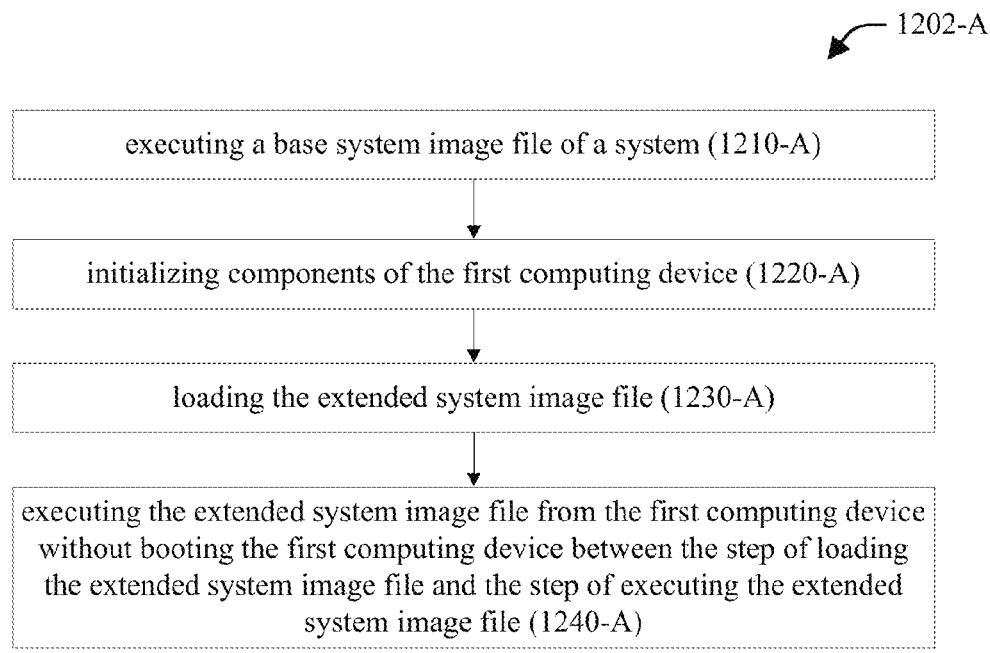
FIG. 12A is a conceptual flow diagram illustrating an example of an operation of split booting.

The subject technology is illustrated, for example, according to various aspects described below. Various examples of aspects of the subject technology are described as numbered clauses (1, 2, 3, etc.) for convenience. These are provided as examples, and do not limit the subject technology. Some of the clauses below are presented, for example, with reference to FIGS. 12A and 11. The other clauses can be presented in a similar manner.

1. A method (see, e.g., item 1202-A in FIG. 12A) for facilitating split booting, comprising:
   executing, from a memory of a first computing device (see, e.g., item 1100 in FIG. 11), a base system image file of a system (see, e.g., item 1210-A in FIG. 12A), wherein the base system image file and an extended system image file of the system are built from a single executable system image file of the system, wherein the base system image file comprises a first set of functions of an operating system, wherein the extended system image file comprises a second set of functions of the operating system, wherein the base system image file resides in the first computing device during the step of executing the base system image file;
   initializing components of the first computing device (see, e.g., item 1220-A in FIG. 12A);
   loading the extended system image file (see, e.g., item 1230-A in FIG. 12A); and
   executing the extended system image file from the first computing device without booting the first computing device between the step of loading the extended system image file and the step of executing the extended system image file (see, e.g., item 1240-A in FIG. 12A), wherein the step of executing the extended system image file occurs after the step of loading.

2. The method of clause 1,
   wherein the extended system image file resides in a second computing device during the step of executing the base system image file,
   wherein the second computing device is different from the first computing device,
   wherein the first computing device comprises a first processing system, wherein the second computing device comprises a second processing system,
   wherein the loading the extended system image file comprises loading the extended system image file onto the first computing device from the second computing device.

3. The method of any of clauses 1 and 2, wherein the step of executing the base system image file is the first time the base system image file is being executed from the memory of the first computing device.

4. The method of any of clauses 1-3,
   wherein the extended system image file further comprises one or more applications, and
   wherein the step of executing the extended system image file comprises:
      running the one or more applications from the extended system image file, which is on the first computing device, without booting the first computing device between the step of loading and the step of running one or more applications, wherein the step of running occurs after the step of loading.

5. The method of any of clauses 1-4,
   wherein the first set of functions of the operating system contained in the base system image file comprises a sign-on function,
   wherein the method further comprises:
      running the sign-on function before the step of loading completes; and
      displaying a sign-on window on a display before the step of loading completes to allow a user to enter credential,
   wherein the step of running the sign-on function occurs in a foreground, and
   wherein the step of loading occurs in a background so that a user is not aware of the step of loading.

6. The method of any of clauses 1-5,
wherein the first set of functions of the operating system contained in the base system image file comprises basic operating system functions, networking system functions, functions for abstracting and managing drawing objects, and a sign-on function.

7. The method of any of clauses 1-5,
wherein the first set of functions of the operating system contained in the base system image file comprises: task scheduler, memory management, a network device driver, a transmission control protocol/Internet protocol (TCP/IP) driver, a graphics display driver, functions for abstracting and managing drawing objects, and a sign-on function,
wherein the second set of functions of the operating system contained in the extended system image file comprises: a connection manager and one or more applications.

8. The method of any of clauses 1-7,
wherein the first computing device comprises a non-volatile memory and a volatile memory, wherein the volatile memory is the memory,
wherein the base system image file resides in the non-volatile memory before the step of executing, from the memory of the first computing device, the base system image file,
wherein the method further comprises:
copying the base system image file from the non-volatile memory into the volatile memory,
wherein the step of executing, from the memory of the first computing device, the base system image file, comprises:
executing the base system image file from the volatile memory.

9. The method of any of clauses 1-8,
wherein the first computing device comprises a non-volatile memory and a volatile memory, wherein the volatile memory is the memory,
wherein the non-volatile memory comprises a basic input/output system (BIOS),
wherein the method further comprises:
executing the BIOS from the non-volatile memory before the step of executing, from the memory of the first computing device, the base system image file;
copying the BIOS from the non-volatile memory into the volatile memory;
executing the BIOS from the volatile memory; and
passing a control from the BIOS to the base system image file to facilitate executing the base system image file,
wherein the BIOS facilitates copying of the base system image file from the non-volatile memory to the volatile memory.

10. The method of any of clauses 1-9,
wherein the memory is a volatile memory,
wherein the step of executing the extended system image file comprises:
presenting one or more applications to a user on a display of the first computing device;
running the one or more applications, wherein the one or more applications are part of the extended system image file;
shutting down the system on the first computing device, while power is provided to the first computing device;
retaining the base system image file and the extended system image file in the volatile memory;
restarting the first computing device using the base system image file and the extended system image file in the volatile memory; and
omitting the step of loading the extended system image file, as the volatile memory already contains the extended system image file.

11. The method of any of clauses 2-10,
wherein the first computing device comprises a non-volatile read-only memory (ROM) and a volatile read/write memory (RAM),
wherein the first computing device does not comprise a non-volatile flash memory,
wherein the memory is the volatile RAM,
wherein the step of executing, from the memory of the first computing device, the base system image file, comprises: executing, from the volatile RAM of the first computing device, the base system image file,
wherein the step of loading the extended system image file comprises loading the extended system image file, from the second computing device over a network, into the volatile RAM of the first computing device at a predetermined memory location at which the extend system image file is linked,
wherein the step of executing the extended system image file comprises running one or more applications of the extended system image file from the volatile RAM,
wherein the base system image file is linked to the extended system image file.

12. The method of any of clauses 1-11,
wherein the first set of functions of the operating system contained in the base system image file comprises a sign-on function,
wherein the method further comprises:
running the sign-on function;
displaying a sign-on window on a display to allow a user to enter credential,
determining whether the extended system image file is loaded onto the first computing device;
receiving a user's command without booting the first computing device between the step of loading and the step of receiving the user's command;
performing one of the following based on the user's command:
rebooting the first computing device;
shutting down the first computing device, while power is provided to the first computing device; or
running one or more applications,
wherein if the step of shutting down is selected, then performing the following operations:
retaining the base system image file and the extended system image file in the volatile memory;
restarting the first computing device using the base system image file and the extended system image file in the volatile memory if a system start is initiated; and
omitting the step of loading the extended system image file, as the volatile memory already contains the extended system image file,
wherein the step of loading occurs only if the extended system image file is not already loaded onto the first computing device,
wherein the step of running the sign-on function and the step of displaying the sign-on window overlap in time with the step of loading, if the step of loading occurs.

13. The method of any of clauses 1-12,
wherein the first computing device comprises a non-volatile memory and a volatile memory, wherein the volatile memory is the memory,
wherein the non-volatile memory comprises one or both of a basic input/output system (BIOS) and the base system image file.

14. The method of clause 1,
wherein the extended system image file resides in the first computing device.

15. The method of clause 1,
wherein the extended system image file resides in the first computing device during the step of executing the base system image file.

16. The method of clause 1,
wherein the base system image file and the extended system image file reside in an integrated drive electronics (IDE) flash memory of the first computing device.

17. The method of clause 1,
wherein the base system image file and the extended system image file reside in an IDE flash memory of the first computing device during the step of executing the base system image file.

18. A machine-readable storage medium encoded with instructions executable by a processing system to carry out the method of any of clauses 1-17.

19. A machine-readable storage medium encoded with instructions executable by a processing system to facilitate performing the method of any of clauses 1-17.

20. An apparatus or a computing device, comprising the machine-readable storage medium of any of clauses 18 and 19.

21. An apparatus or a computing device, comprising means for carrying out the method of any of clauses 1-17.

22. An apparatus or a computing device, comprising means for facilitating performing the method of any of clauses 1-17.

23. The apparatus or the computing device of any of clauses 20-23, further comprising a processing system and a memory.

Illustration of Machine-Readable Storage Medium for Split Booting (Described as Clauses)

Figure 12B:
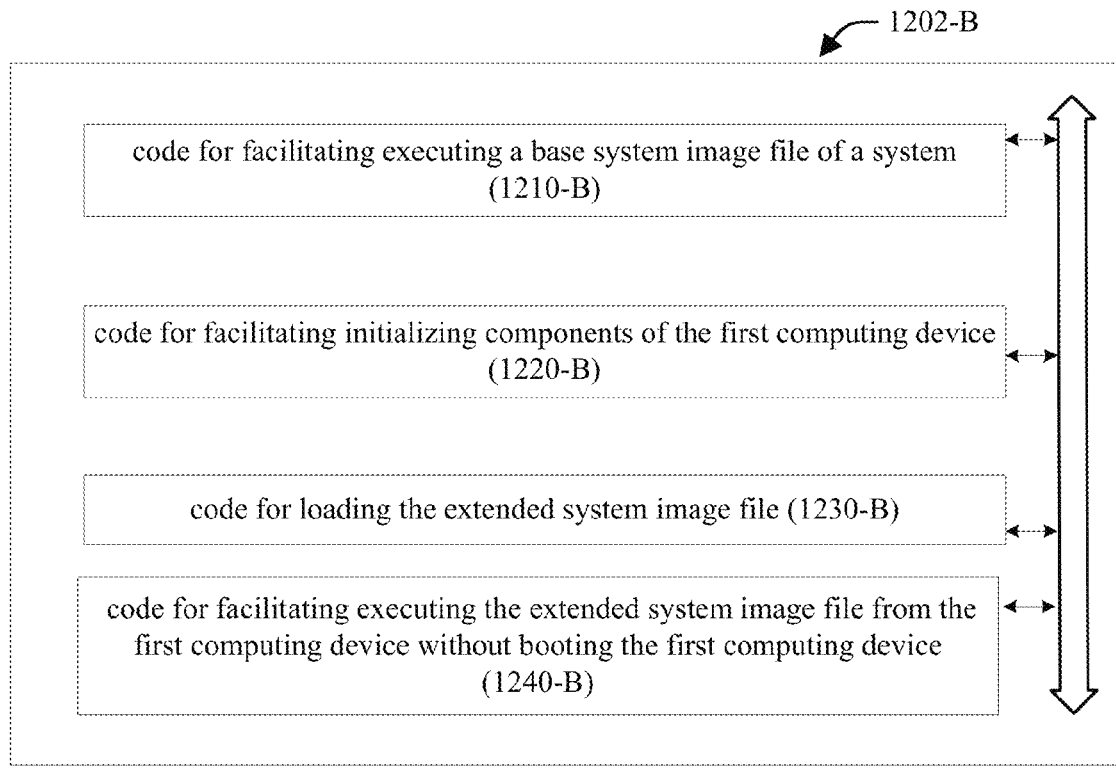
FIG. 12B is a conceptual block diagram illustrating an example of a hardware configuration for a machine-readable storage medium.

The subject technology is illustrated, for example, according to various aspects described below. Various examples of aspects of the subject technology are described as numbered clauses (1, 2, 3, etc.) for convenience. These are provided as examples, and do not limit the subject technology. Clause 1 below is presented, for example, with reference to FIGS. 12B and 11. The other clauses can be presented in a similar manner.

In one aspect, some or all of the instructions provided below are contained in a base system image file of a system. In another aspect, some or all of the instructions provided below are contained in a base system image file of a system and an extended system image file of the system.

1. A machine-readable storage medium (see, e.g., item 1202 in FIG. 12B, or item 1119 or 1110 in FIG. 11) encoded with instructions executable by a first processing system to perform a method for facilitating split booting, the instructions comprising code for:
facilitating executing, from a memory of a first computing device, a base system image file of a system (see, e.g., item 1210-B in FIG. 12B), wherein the base system image file and an extended system image file of the system are built from a single executable system image file of the system, wherein the base system image file comprises a first set of functions of an operating system, wherein the extended system image file comprises a second set of functions of the operating system, wherein the base system image file is to reside in the first computing device during the step of facilitating executing the base system image file;
facilitating initializing components of the first computing device (see, e.g., item 1220-B in FIG. 12B);
loading the extended system image file (see, e.g., item 1230-B in FIG. 12B); and
facilitating executing the extended system image file from the first computing device without booting the first computing device between the step of loading the extended system image file and the step of facilitating executing the extended system image file (see, e.g., item 1240-B in FIG. 12B), wherein the step of facilitating executing the extended system image file occurs after the step of loading.

2. The machine-readable storage medium of clause 1,
wherein the extended system image file is to reside in a second computing device during the step of facilitating executing the base system image file,
wherein the second computing device is different from the first computing device,
wherein the first computing device comprises a first processing system, wherein the second computing device comprises a second processing system,
wherein the loading the extended system image file comprises loading the extended system image file onto the first computing device from the second computing device.

3. The machine-readable storage medium of any of clauses 1 and 2, wherein the step of facilitating executing the base system image file is the first time the base system image file is being executed from the memory of the first computing device.

4. The machine-readable storage medium of any of clauses 1-3,
wherein the extended system image file further comprises one or more applications, and
wherein the code of facilitating executing the extended system image file comprises code for:
running the one or more applications from the extended system image file, which is on the first computing device, without booting the first computing device between the step of loading and the step of running one or more applications, wherein the step of running occurs after the step of loading.

5. The machine-readable storage medium of any of clauses 1-4,
wherein the first set of functions of the operating system contained in the base system image file comprises a sign-on function,
wherein the instructions further comprise code for:
running the sign-on function before the step of loading completes; and
displaying a sign-on window on a display before the step of loading completes to allow a user to enter credential,
wherein the step of running the sign-on function occurs in a foreground, and
wherein the step of loading occurs in a background so that a user is not aware of the step of loading.

6. The machine-readable storage medium of any of clauses 1-5,
wherein the first set of functions of the operating system contained in the base system image file comprises basic operating system functions, networking system functions, functions for abstracting and managing drawing objects, and a sign-on function.

7. The machine-readable storage medium of any of clauses 1-5,
wherein the first set of functions of the operating system contained in the base system image file comprises: task scheduler, memory management, a network device driver, a transmission control protocol/Internet protocol (TCP/IP) driver, a graphics display driver, functions for abstracting and managing drawing objects, and a sign-on function, wherein the second set of functions of the operating system contained in the extended system image file comprises: a connection manager and one or more applications.

8. The machine-readable storage medium of any of clauses 1-7,
wherein the first computing device comprises a non-volatile memory and a volatile memory, wherein the volatile memory is the memory,
wherein the base system image file resides in the non-volatile memory before the step of facilitating executing, from the memory of the first computing device, the base system image file,
wherein the instructions further comprise code for:
copying the base system image file from the non-volatile memory into the volatile memory,
wherein the code for facilitating executing, from the memory of the first computing device, the base system image file, comprises code for:
facilitating executing the base system image file from the volatile memory.

9. The machine-readable storage medium of any of clauses 1-8,
wherein the first computing device comprises a non-volatile memory and a volatile memory, wherein the volatile memory is the memory,
wherein the non-volatile memory comprises a basic input/output system (BIOS),
wherein the instructions further comprise code for:
facilitating executing the BIOS from the non-volatile memory before the step of facilitating executing, from the memory of the first computing device, the base system image file;
copying the BIOS from the non-volatile memory into the volatile memory;
facilitating executing the BIOS from the volatile memory; and
passing a control from the BIOS to the base system image file to facilitate executing the base system image file,
wherein the BIOS facilitates copying of the base system image file from the non-volatile memory to the volatile memory.

10. The machine-readable storage medium of any of clauses 1-9,
wherein the memory is a volatile memory,
wherein the code for facilitating executing the extended system image file comprises codes for:
presenting one or more applications to a user on a display of the first computing device;
running the one or more applications, wherein the one or more applications are part of the extended system image file;
shutting down the system on the first computing device, while power is provided to the first computing device;
retaining the base system image file and the extended system image file in the volatile memory;
restarting the first computing device using the base system image file and the extended system image file in the volatile memory; and
omitting the step of loading the extended system image file, as the volatile memory already contains the extended system image file.

11. The machine-readable storage medium of any of clauses 2-10,
wherein the first computing device comprises a non-volatile read-only memory (ROM) and a volatile read/write memory (RAM),
wherein the first computing device does not comprise a non-volatile flash memory,
wherein the memory is the volatile RAM,
wherein the code for facilitating executing, from the memory of the first computing device, the base system image file, comprises code for facilitating executing, from the volatile RAM of the first computing device, the base system image file,
wherein the code for loading the extended system image file comprises code for loading the extended system image file, from the second computing device over a network, into the volatile RAM of the first computing device at a predetermined memory location at which the extend system image file is linked,
wherein the code for facilitating executing the extended system image file comprises code for running one or more applications of the extended system image file from the volatile RAM,
wherein the base system image file is linked to the extended system image file.

12. The machine-readable storage medium of any of clauses 1-11,
wherein the first set of functions of the operating system contained in the base system image file comprises a sign-on function,
wherein the instructions further comprise code for:
running the sign-on function;
displaying a sign-on window on a display to allow a user to enter credential,
determining whether the extended system image file is loaded onto the first computing device;
receiving a user's command without booting the first computing device between the step of loading and the step of receiving the user's command;
performing one of the following based on the user's command:
rebooting the first computing device;
shutting down the first computing device, while power is provided to the first computing device; or
running one or more applications,
wherein if the step of shutting down is selected, then performing the following operations:
retaining the base system image file and the extended system image file in the volatile memory;
restarting the first computing device using the base system image file and the extended system image file in the volatile memory if a system start is initiated; and
omitting the step of loading the extended system image file, as the volatile memory already contains the extended system image file,
wherein the step of loading occurs only if the extended system image file is not already loaded onto the first computing device,
wherein the step of running the sign-on function and the step of displaying the sign-on window overlap in time with the step of loading, if the step of loading occurs.

13. The machine-readable storage medium of any of clauses 1-12,
wherein the first computing device comprises a non-volatile memory and a volatile memory, wherein the volatile memory is the memory,
wherein the non-volatile memory comprises one or both of a basic input/output system (BIOS) and the base system image file.

Illustration of Computing Device for Split Booting (Described as Clauses)

Figure 12C:
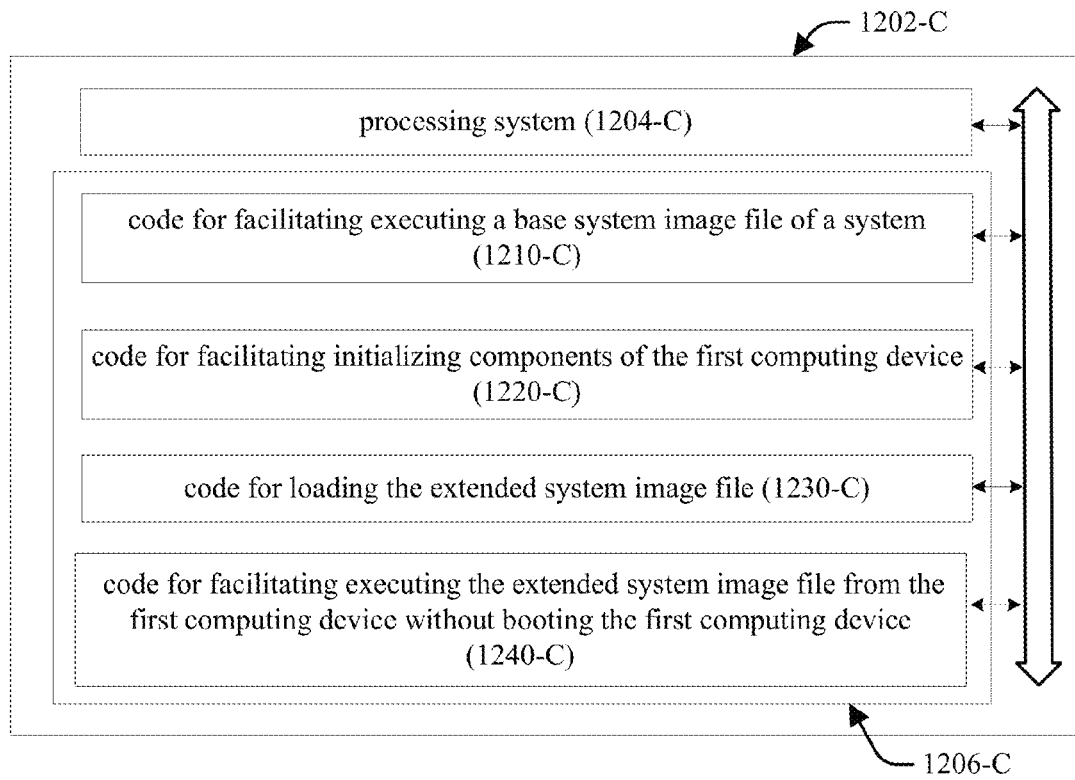
FIG. 12C is a conceptual block diagram illustrating an example of a hardware configuration of a computing device.

The subject technology is illustrated, for example, according to various aspects described below. Various examples of aspects of the subject technology are described as numbered clauses (1, 2, 3, etc.) for convenience. These are provided as examples, and do not limit the subject technology. Clause 1 below is presented, for example, with reference to FIGS. 12C, 11 and 10. The other clauses can be presented in a similar manner.

1. A computing device (see, e.g., item 1202-C in FIG. 12C, item 1100 in FIG. 11 or item 1002 in FIG. 10), comprising:
a first processing system (see, e.g., item 1204-C in FIG. 12C); and
a machine-readable storage medium (see, e.g., item 1206-C in FIG. 12C) comprising instructions executable by the first processing system, the instructions comprising code for:
facilitating executing a base system image file of a system, (see, e.g., item 1210-C in FIG. 12C) wherein the base system image file and an extended system image file of the system are built from a single executable system image file of the system, wherein the base system image file comprises a first set of functions of an operating system, wherein the extended system image file comprises a second set of functions of the operating system, wherein the base system image file resides in the computing device (e.g., item 1002 in FIG. 10) during the step of facilitating executing the base system image file;
facilitating initializing components of the computing device (see, e.g., item 1220-C in FIG. 12C);
loading the extended system image file (see, e.g., item 1230-C in FIG. 12C); and
facilitating executing the extended system image file from the computing device without booting the computing device between the step of loading the extended system image file and the step of facilitating executing the extended system image file (see, e.g., item 1240-C in FIG. 12C), wherein the step of facilitating executing the extended system image file occurs after the step of loading.

2. The computing device of clause 1,
wherein the extended system image file resides, preferably, in a second computing device (e.g., item 1004 in FIG. 10) during the step of facilitating executing the base system image file,
wherein the second computing device is different from the computing device,
wherein the computing device comprises a first processing system, wherein the second computing device comprises a second processing system,
wherein the loading the extended system image file comprises loading the extended system image file onto the computing device from the second computing device.

3. The computing device of any of clauses 1 and 2, wherein the step of facilitating executing the base system image file is the first time the base system image file is being executed from a memory of the computing device.

4. The computing device of any of clauses 1-3,
wherein the extended system image file further comprises one or more applications, and
wherein the code of facilitating executing the extended system image file comprises code for:
running the one or more applications from the extended system image file, which is on the computing device, without booting the computing device between the step of loading and the step of running one or more applications, wherein the step of running occurs after the step of loading.

5. The computing device of any of clauses 1-4,
wherein the first set of functions of the operating system contained in the base system image file comprises a sign-on function,
wherein the instructions further comprise code for:
running the sign-on function before the step of loading completes; and
displaying a sign-on window on a display before the step of loading completes to allow a user to enter credential,
wherein the step of running the sign-on function occurs in a foreground, and
wherein the step of loading occurs in a background so that a user is not aware of the step of loading.

6. The computing device of any of clauses 1-5,
wherein the first set of functions of the operating system contained in the base system image file comprises basic operating system functions, networking system functions, functions for abstracting and managing drawing objects, and a sign-on function.

7. The computing device of any of clauses 1-5,
wherein the first set of functions of the operating system contained in the base system image file comprises: task scheduler, memory management, a network device driver, a transmission control protocol/Internet protocol (TCP/IP) driver, a graphics display driver, functions for abstracting and managing drawing objects, and a sign-on function,
wherein the second set of functions of the operating system contained in the extended system image file comprises: a connection manager and one or more applications.

8. The computing device of any of clauses 1-7,
wherein the computing device comprises a non-volatile memory and a volatile memory,
wherein the base system image file resides in the non-volatile memory before the step of facilitating executing the base system image file,
wherein the instructions further comprise code for:
copying the base system image file from the non-volatile memory into the volatile memory,
wherein the code for facilitating executing the base system image file, comprises code for:
facilitating executing the base system image file from the volatile memory.

9. The computing device of any of clauses 1-8,
wherein the computing device comprises a non-volatile memory and a volatile memory,
wherein the non-volatile memory comprises a basic input/output system (BIOS),
wherein the instructions further comprise code for:
facilitating executing the BIOS from the non-volatile memory before the step of facilitating executing the base system image file;
copying the BIOS from the non-volatile memory into the volatile memory;
facilitating executing the BIOS from the volatile memory; and
passing a control from the BIOS to the base system image file to facilitate executing the base system image file,
wherein the BIOS facilitates copying of the base system image file from the non-volatile memory to the volatile memory.

10. The computing device of any of clauses 1-9,
wherein computing device comprises a volatile memory,
wherein the code for facilitating executing the extended system image file comprises codes for:
presenting one or more applications to a user on a display of the computing device;

running the one or more applications, wherein the one or more applications are part of the extended system image file;

shutting down the system on the computing device, while power is provided to the computing device;

retaining the base system image file and the extended system image file in the volatile memory;

restarting the computing device using the base system image file and the extended system image file in the volatile memory; and omitting the step of loading the extended system image file, as the volatile memory already contains the extended system image file.

11. The computing device of any of clauses 2-10, wherein the computing device comprises a non-volatile read-only memory (ROM) and a volatile read/write memory (RAM), wherein the computing device does not comprise a non-volatile flash memory, wherein the code for facilitating executing the base system image file comprises code for facilitating executing, from the volatile RAM of the computing device, the base system image file, wherein the code for loading the extended system image file comprises code for loading the extended system image file, from the second computing device over a network, into the volatile RAM of the computing device at a predetermined memory location at which the extend system image file is linked, wherein the code for facilitating executing the extended system image file comprises code for running one or more applications of the extended system image file from the volatile RAM, wherein the base system image file is linked to the extended system image file.

12. The computing device of any of clauses 1-11, wherein the first set of functions of the operating system contained in the base system image file comprises a sign-on function, wherein the instructions further comprise code for:

running the sign-on function;

displaying a sign-on window on a display to allow a user to enter credential;

determining whether the extended system image file is loaded onto the computing device;

receiving a user's command without booting the computing device between the step of loading and the step of receiving the user's command;

performing one of the following based on the user's command:

rebooting the computing device;

shutting down the computing device, while power is provided to the computing device; or running one or more applications, wherein if the step of shutting down is selected, then performing the following operations:

retaining the base system image file and the extended system image file in the volatile memory;

restarting the computing device using the base system image file and the extended system image file in the volatile memory if a system start is initiated; and omitting the step of loading the extended system image file, as the volatile memory already contains the extended system image file, wherein the step of loading occurs only if the extended system image file is not already loaded onto the computing device, wherein the step of running the sign-on function and the step of displaying the sign-on window overlap in time with the step of loading, if the step of loading occurs.

13. The computing device of any of clauses 1-12, wherein the computing device comprises a non-volatile memory and a volatile memory, wherein the non-volatile memory comprises one or both of a basic input/output system (BIOS) and the base system image file.

Illustration of Computing Device for Split Booting (Described as Clauses)

The subject technology is illustrated, for example, according to various aspects described below. Various examples of aspects of the subject technology are described as numbered clauses (1, 2, 3, etc.) for convenience. These are provided as examples, and do not limit the subject technology. Clause 1 below is presented, for example, with reference to FIGS. 12D and 11. The other clauses can be presented in a similar manner.

Figure 12D:
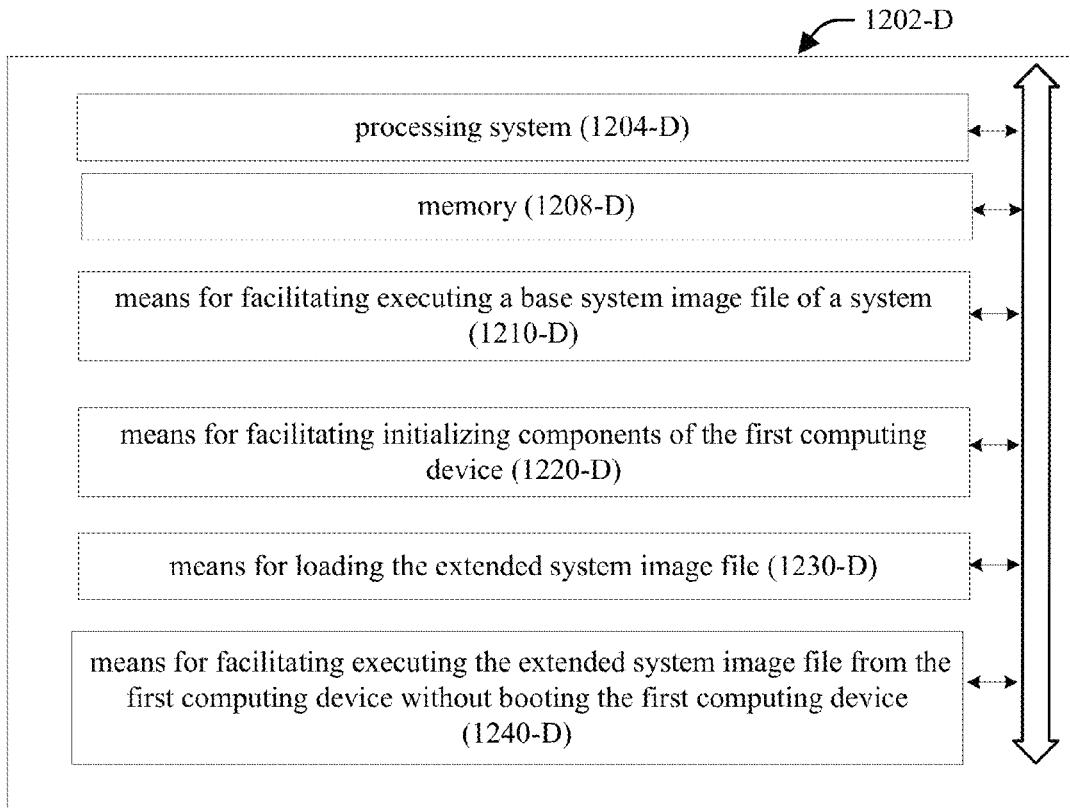
FIG. 12D is a conceptual block diagram illustrating an example of a hardware configuration of a computing device.
Figure 13A:
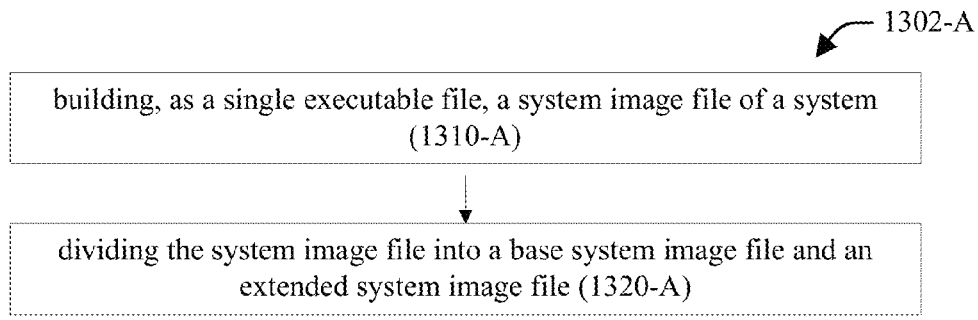
FIG. 13A is a conceptual flow diagram illustrating an example of an operation of building system images.
Figure 13B:
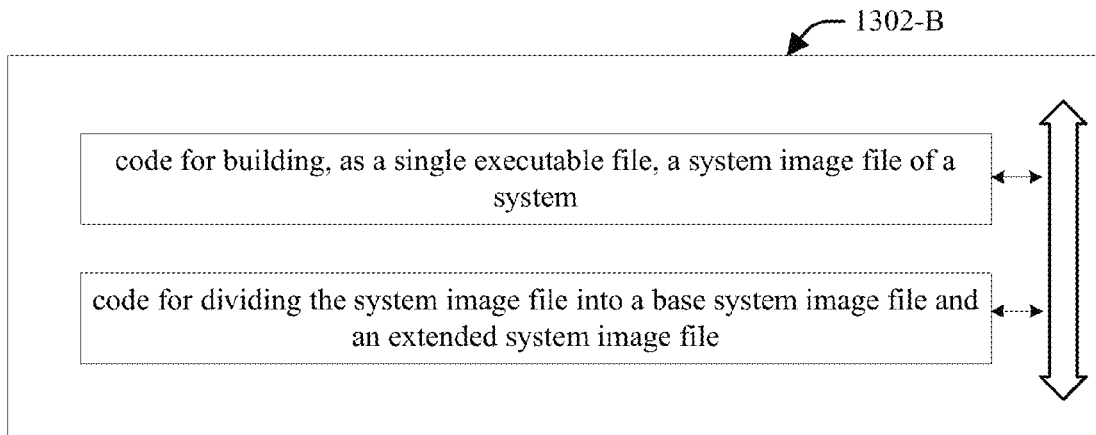
FIG. 13B is a conceptual block diagram illustrating an example of a hardware configuration for a machine-readable storage medium.
Figure 13C:
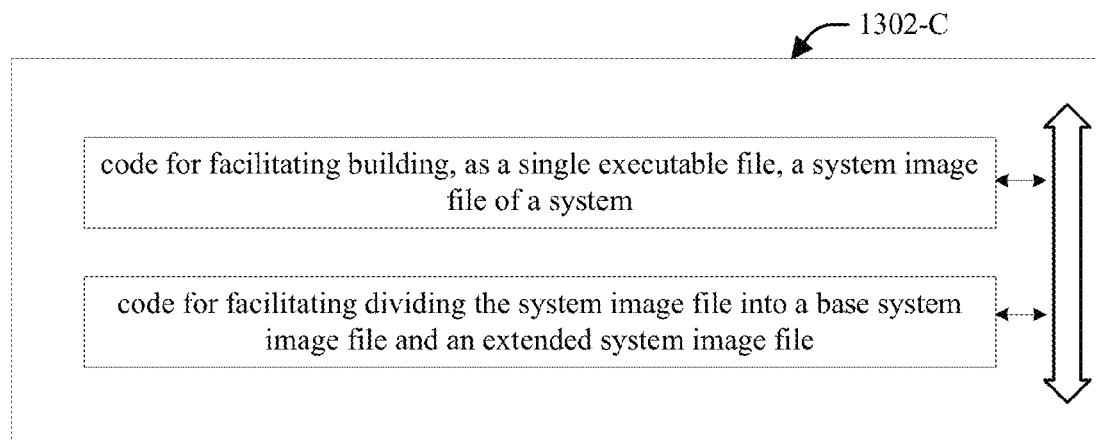
FIG. 13C is a conceptual block diagram illustrating an example of a hardware configuration for a machine-readable storage medium.
Figure 13D:
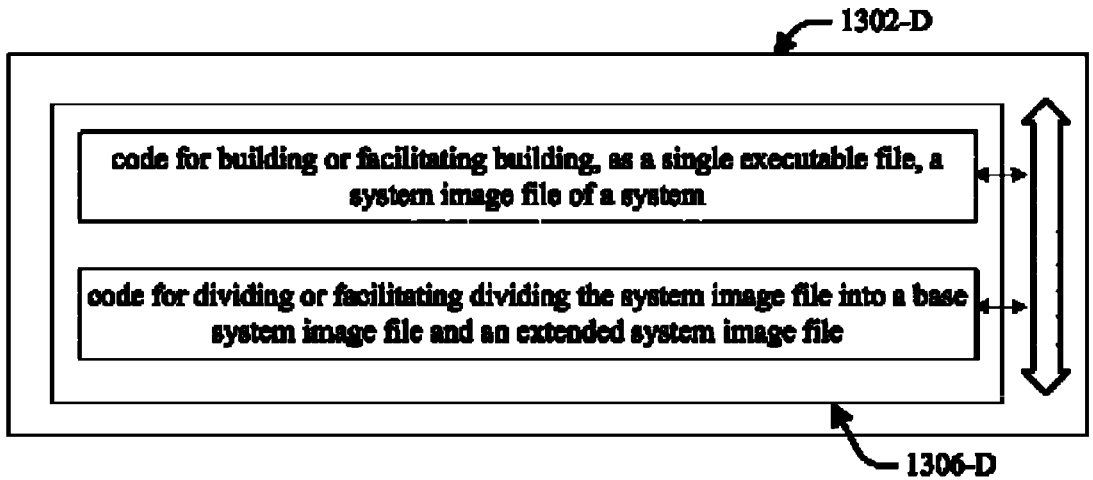
FIG. 13D is a conceptual block diagram illustrating an example of a hardware configuration of an apparatus or a computing device.
Figure 13E:
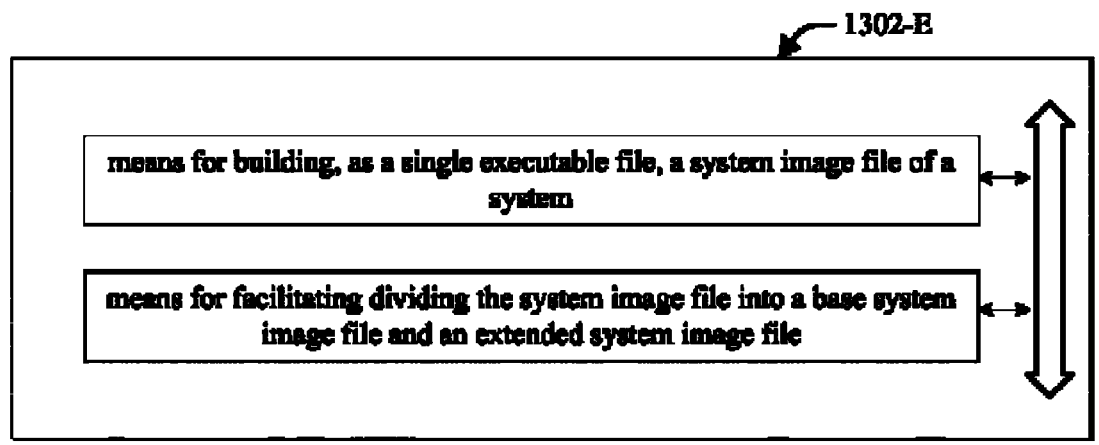
FIG. 13E is a conceptual block diagram illustrating an example of a hardware configuration of an apparatus or a computing device.
Figure 13F:
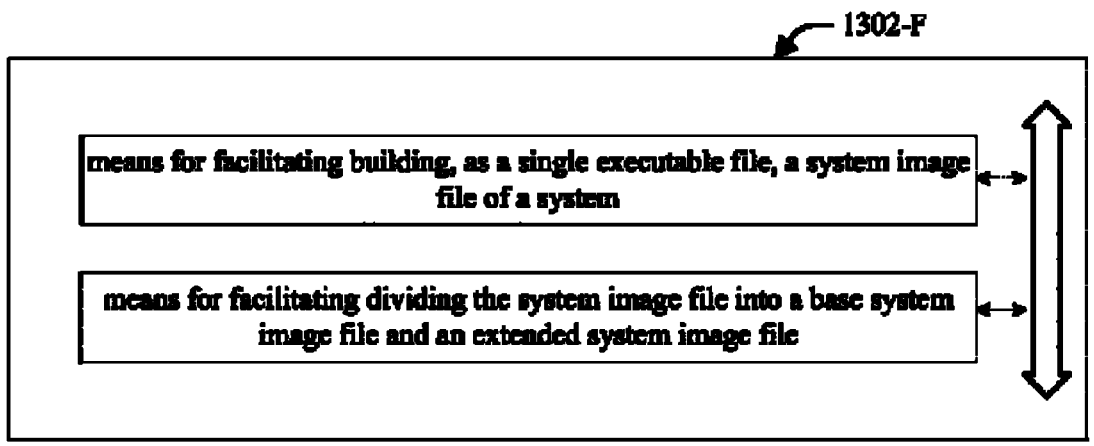
FIG. 13F is a conceptual block diagram illustrating an example of a hardware configuration of an apparatus or a computing device.

1. A computing device (see, e.g., item 1202-D in FIG. 12D or item 1100 in FIG. 11), comprising:

a first processing system (see, e.g., item 1204-D in FIG. 12D);

a memory (see, e.g., item 1208-D in FIG. 12D);

means for facilitating executing, from the memory of the computing device, a base system image file of a system (see, e.g., item 1210-D in FIG. 12D), wherein the base system image file and an extended system image file of the system are built from a single executable system image file of the system, wherein the base system image file comprises a first set of functions of an operating system, wherein the extended system image file comprises a second set of functions of the operating system, wherein the base system image file resides in the computing device during facilitating executing the base system image file;

means for facilitating initializing components of the computing device (see, e.g., item 1220-D in FIG. 12D);

means for loading the extended system image file (see, e.g., item 1230-D in FIG. 12D); and means for facilitating executing the extended system image file from the computing device without booting the computing device between loading the extended system image file and executing the extended system image file (see, e.g., item 1240-D in FIG. 12D), wherein the facilitating executing the extended system image file is to occur after the loading.

2. The computing device of clause 1, wherein the extended system image file resides in a second computing device during executing the base system image file, wherein the second computing device is different from the computing device, wherein the computing device comprises a first processing system, wherein the second computing device comprises a second processing system, wherein the loading the extended system image file comprises loading the extended system image file onto the computing device from the second computing device.

3. The computing device of any of clauses 1 and 2, wherein the means for facilitating executing the base system image file comprises means for facilitating executing the base system image file for the first time from the memory of the computing device.

4. The computing device of any of clauses 1-3,
wherein the extended system image file further comprises one or more applications, and
wherein the means for facilitating executing the extended system image file comprises:
   means for running the one or more applications from the extended system image file, which is on the computing device, without booting the computing device between the loading and the running one or more applications, wherein the running is to occur after the loading.

5. The computing device of any of clauses 1-4,
wherein the first set of functions of the operating system contained in the base system image file comprises a sign-on function,
   wherein the computing device further comprises:
   means for running the sign-on function before loading completes; and
   means for displaying a sign-on window on a display before loading completes to allow a user to enter credential,
   wherein the running the sign-on function is to occur in a foreground, and
   wherein the loading is to occur in a background so that a user is not aware of the loading.

6. The computing device of any of clauses 1-5,
wherein the first set of functions of the operating system contained in the base system image file comprises basic operating system functions, networking system functions, functions for abstracting and managing drawing objects, and a sign-on function.

7. The computing device of any of clauses 1-5,
wherein the first set of functions of the operating system contained in the base system image file comprises: task scheduler, memory management, a network device driver, a transmission control protocol/Internet protocol (TCP/IP) driver, a graphics display driver, functions for abstracting and managing drawing objects, and a sign-on function,
   wherein the second set of functions of the operating system contained in the extended system image file comprises: a connection manager and one or more applications.

8. The computing device of any of clauses 1-7,
wherein the computing device comprises a non-volatile memory and a volatile memory, wherein the volatile memory is the memory,
wherein the base system image file resides in the non-volatile memory before executing, from the memory of the computing device, the base system image file,
   wherein the computing device further comprises:
   means for copying the base system image file from the non-volatile memory into the volatile memory,
   wherein the means for facilitating executing, from the memory of the computing device, the base system image file, comprises:
   means for facilitating executing the base system image file from the volatile memory.

9. The computing device of any of clauses 1-8,
wherein the computing device comprises a non-volatile memory and a volatile memory, wherein the volatile memory is the memory,
wherein the non-volatile memory comprises a basic input/output system (BIOS),
   wherein the computing device further comprises:
   means for facilitating executing the BIOS from the non-volatile memory before executing, from the memory of the computing device, the base system image file;
   means for copying the BIOS from the non-volatile memory into the volatile memory;
   means for facilitating executing the BIOS from the volatile memory; and
   means for passing a control from the BIOS to the base system image file to facilitate executing the base system image file,
   wherein the BIOS facilitates copying of the base system image file from the non-volatile memory to the volatile memory.

10. The computing device of any of clauses 1-9,
wherein the memory is a volatile memory,
wherein the means for facilitating executing the extended system image file comprises:
   means for presenting one or more applications to a user on a display of the computing device;
   means for running the one or more applications, wherein the one or more applications are part of the extended system image file;
   means for shutting down the system on the computing device, while power is provided to the computing device;
   means for retaining the base system image file and the extended system image file in the volatile memory;
   means for restarting the computing device using the base system image file and the extended system image file in the volatile memory; and
   means for omitting loading the extended system image file, as the volatile memory already contains the extended system image file.

11. The computing device of any of clauses 2-10,
wherein the computing device comprises a non-volatile read-only memory (ROM) and a volatile read/write memory (RAM),
   wherein the computing device does not comprise a non-volatile flash memory,
   wherein the memory is the volatile RAM,
   wherein the means for facilitating executing, from the memory of the computing device, the base system image file, comprises: means for facilitating executing, from the volatile RAM of the computing device, the base system image file,
   wherein the means for loading the extended system image file comprises means for loading the extended system image file, from the second computing device over a network, into the volatile RAM of the computing device at a predetermined memory location at which the extend system image file is linked,
   wherein the means for facilitating executing the extended system image file comprises means for running one or more applications of the extended system image file from the volatile RAM,
   wherein the base system image file is linked to the extended system image file.

12. The computing device of any of clauses 1-11,
wherein the first set of functions of the operating system contained in the base system image file comprises a sign-on function,
   wherein the computing device further comprises:
   means for running the sign-on function;
   means for displaying a sign-on window on a display to allow a user to enter credential,
   means for determining whether the extended system image file is loaded onto the computing device;
   means for receiving a user's command without booting the computing device between loading and receiving the user's command;

means for performing one of the following based on the user's command:
  rebooting the computing device;
  shutting down the computing device, while power is provided to the computing device; or
  running one or more applications,
wherein if shutting down is selected, then means for performing the following operations:
  means for retaining the base system image file and the extended system image file in the volatile memory;
  means for restarting the computing device using the base system image file and the extended system image file in the volatile memory if a system start is initiated; and
  means for omitting loading the extended system image file, as the volatile memory already contains the extended system image file,
wherein the loading is to occur only if the extended system image file is not already loaded onto the computing device,
wherein running the sign-on function and displaying the sign-on window are to overlap in time with the loading, if the loading occurs.

13. The computing device of any of clauses 1-12,
wherein the computing device comprises a non-volatile memory and a volatile memory, wherein the volatile memory is the memory,
wherein the non-volatile memory comprises one or both of a basic input/output system (BIOS) and the base system image file.

Illustration of Method for Building System Images (Described as Clauses)

The subject technology is illustrated, for example, according to various aspects described below. Various examples of aspects of the subject technology are described as numbered clauses (1, 2, 3, etc.) for convenience. These are provided as examples, and do not limit the subject technology. Some of the clauses below are presented, for example, with reference to FIGS. 13A-13F and 11. The other clauses can be presented in a similar manner.

1. A method (see, e.g., item 1302-A in FIG. 13A) for building system images to facilitate split booting, comprising:
  building, as a single executable file, a system image file of a system (see, e.g., item 1310-A in FIG. 13A),
    wherein the system image file comprises a base portion and an extended portion,
    wherein the base portion comprises a first set of functions of an operating system, wherein the first set of functions of the operating system comprises basic operating system functions, networking system functions, functions for abstracting and managing drawing objects, and a sign-on function,
    wherein the extended portion comprises a second set of functions of the operating system and one or more applications; and
  dividing the system image file into a base system image file and an extended system image file (see, e.g., item 1320-A in FIG. 13A), wherein the base system image file comprises the base portion, and the extended system image file comprises the extended portion.

2. The method of clause 1, further comprising:
  copying the base system image file onto a non-volatile memory of a first computing device, and
  copying the extended system image file onto a second computing device, to be loaded to the first computing device at a later time.

3. The method of any of clauses 1 and 2, wherein the non-volatile memory comprises a basic input/output system (BIOS).

4. The method of any of clauses 1-3, wherein the system image file consists of the base portion and the extended portion, the base system image file consists of the base portion, the extended system image file consists of the extended portion, and the second set of functions of the operating system consists of the remaining functions of the operating system.

5. The method of any of clauses 1-4,
wherein the system consists of a plurality of functions,
wherein the plurality of functions comprise the first set of functions of the operating system, the second set of functions of the operating system and the one or more applications,
wherein the step of building comprises:
  compiling the plurality of functions of the system; and
  linking the plurality of functions of the system,
  wherein the base system image file and the extended system image file are linked together,
wherein the base system image file comprises functions to initialize hardware and software operating environment.

6. The method of any of clauses 1-5,
wherein the method is performed at a computing build device,
wherein the computing build device comprises a memory and a processing system,
wherein the step of building comprises building the system image file of the system onto the memory of the computing build device,
wherein the step of dividing is performed by the processing system,
wherein the base system image file and the extended system image file are placed onto the memory.

7. A machine-readable storage medium (see, e.g., item 1302-B in FIG. 13B or item 1119 or 1110 in FIG. 11) encoded with instructions or code executable by a processing system to carry out the method of any of clauses 1-6.

8. A machine-readable storage medium (see, e.g., item 1302-C in FIG. 13C or item 1119 or 1110 in FIG. 11) encoded with instructions or code executable by a processing system to facilitate performing the method of any of clauses 1-6.

9. An apparatus or a computing device (see, e.g., item 1302-D in FIG. 13D or item 1100 in FIG. 11), comprising the machine-readable storage medium (see, e.g., item 1306-D in FIG. 13D) of any of clauses 7 and 8.

10. An apparatus or a computing device (see, e.g., item 1302-E in FIG. 13E or item 1100 in FIG. 11), comprising means for carrying out the method of any of clauses 1-6.

11. An apparatus or a computing device (see, e.g., item 1302-F in FIG. 13F or item 1100 in FIG. 11), comprising means for facilitating performing the method of any of clauses 1-6.

12. The apparatus or the computing device of any of clauses 9-11, further comprising a first processing system and a memory.

Closing Subheading

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. In one example, means for performing a method or means for facilitating performing a method may include software code or subroutines. In another example, means for performing a method or means for facilitating performing a method may include specific hardware (e.g., FPGA, ASIC, PLD, controller). Various components and blocks may be arranged differently (e.g., arranged in a different order, or partitioned in a different way) all without departing from the scope of the subject technology. In one aspect of the disclosure, an operating system is not a Windows operating system, such as Windows XP or Windows 7.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A machine-readable storage medium encoded with instructions executable by a first processing system to perform a method for facilitating split booting, the instructions comprising code for:

facilitating executing, from a memory of a first computing device, a base system image file of a system, wherein the base system image file and an extended system image file of the system are built from a single executable system image file of the system, wherein the base system image file comprises a first set of functions of an operating system, wherein the extended system image file comprises a second set of functions of the operating system, wherein the base system image file is to reside in the first computing device during the step of facilitating executing the base system image file;

facilitating initializing components of the first computing device;

loading the extended system image file; and facilitating executing the extended system image file from the first computing device without booting the first computing device between the step of loading the extended system image file and the step of facilitating executing the extended system image file, wherein the step of facilitating executing the extended system image file occurs after the step of loading.

2. The machine-readable storage medium of claim 1, wherein the extended system image file is to reside in a second computing device during the step of facilitating executing the base system image file, wherein the second computing device is different from the first computing device, wherein the first computing device comprises a first processing system, wherein the second computing device comprises a second processing system, wherein the loading the extended system image file comprises loading the extended system image file onto the first computing device from the second computing device.

3. The machine-readable storage medium of claim 1, wherein the step of facilitating executing the base system image file is the first time the base system image file is being executed from the memory of the first computing device.

4. The machine-readable storage medium of claim 1, wherein the extended system image file further comprises one or more applications, and wherein the code of facilitating executing the extended system image file comprises code for:

running the one or more applications from the extended system image file, which is on the first computing device, without booting the first computing device between the step of loading and the step of running one or more applications, wherein the step of running occurs after the step of loading.

5. The machine-readable storage medium of claim 1,
wherein the first set of functions of the operating system contained in the base system image file comprises a sign-on function,
wherein the instructions further comprise code for:
  running the sign-on function before the step of loading completes; and
  displaying a sign-on window on a display before the step of loading completes to allow a user to enter credential,
wherein the step of running the sign-on function occurs in a foreground, and
wherein the step of loading occurs in a background so that a user is not aware of the step of loading.

6. The machine-readable storage medium of claim 1,
wherein the first set of functions of the operating system contained in the base system image file comprises basic operating system functions, networking system functions, functions for abstracting and managing drawing objects, and a sign-on function.

7. The machine-readable storage medium of claim 1,
wherein the first set of functions of the operating system contained in the base system image file comprises: task scheduler, memory management, a network device driver, a transmission control protocol/Internet protocol (TCP/IP) driver, a graphics display driver, functions for abstracting and managing drawing objects, and a sign-on function,
wherein the second set of functions of the operating system contained in the extended system image file comprises: a connection manager and one or more applications.

8. The machine-readable storage medium of claim 1,
wherein the first computing device comprises a non-volatile memory and a volatile memory, wherein the volatile memory is the memory,
wherein the base system image file resides in the non-volatile memory before the step of facilitating executing, from the memory of the first computing device, the base system image file,
wherein the instructions further comprise code for:
  copying the base system image file from the non-volatile memory into the volatile memory,
wherein the code for facilitating executing, from the memory of the first computing device, the base system image file, comprises code for:
  facilitating executing the base system image file from the volatile memory.

9. The machine-readable storage medium of claim 1,
wherein the first computing device comprises a non-volatile memory and a volatile memory, wherein the volatile memory is the memory,
wherein the non-volatile memory comprises a basic input/output system (BIOS), wherein the instructions further comprise code for:
  facilitating executing the BIOS from the non-volatile memory before the step of facilitating executing, from the memory of the first computing device, the base system image file;
  copying the BIOS from the non-volatile memory into the volatile memory;
  facilitating executing the BIOS from the volatile memory; and
  passing a control from the BIOS to the base system image file to facilitate executing the base system image file,
wherein the BIOS facilitates copying of the base system image file from the non-volatile memory to the volatile memory.

10. The machine-readable storage medium of claim 1,
wherein the memory is a volatile memory,
wherein the code for facilitating executing the extended system image file comprises codes for:
  presenting one or more applications to a user on a display of the first computing device;
  running the one or more applications, wherein the one or more applications are part of the extended system image file;
  shutting down the system on the first computing device, while power is provided to the first computing device;
  retaining the base system image file and the extended system image file in the volatile memory;
  restarting the first computing device using the base system image file and the extended system image file in the volatile memory; and
  omitting the step of loading the extended system image file, as the volatile memory already contains the extended system image file.

11. The machine-readable storage medium of claim 2,
wherein the first computing device comprises a non-volatile read-only memory (ROM) and a volatile read/write memory (RAM),
wherein the first computing device does not comprise a non-volatile flash memory,
wherein the memory is the volatile RAM,
wherein the code for facilitating executing, from the memory of the first computing device, the base system image file, comprises code for facilitating executing, from the volatile RAM of the first computing device, the base system image file,
wherein the code for loading the extended system image file comprises code for loading the extended system image file, from the second computing device over a network, into the volatile RAM of the first computing device at a predetermined memory location at which the extend system image file is linked,
wherein the code for facilitating executing the extended system image file comprises code for running one or more applications of the extended system image file from the volatile RAM,
wherein the base system image file is linked to the extended system image file.

12. The machine-readable storage medium of claim 1,
wherein the first set of functions of the operating system contained in the base system image file comprises a sign-on function,
wherein the instructions further comprise code for:
  running the sign-on function;
  displaying a sign-on window on a display to allow a user to enter credential,
  determining whether the extended system image file is loaded onto the first computing device;
  receiving a user's command without booting the first computing device between the step of loading and the step of receiving the user's command;
  performing one of the following based on the user's command:
    rebooting the first computing device;
    shutting down the first computing device, while power is provided to the first computing device; or
    running one or more applications, wherein if the step of shutting down is selected, then performing the following operations:
retaining the base system image file and the extended system image file in the volatile memory;
restarting the first computing device using the base system image file and the extended system image file in the volatile memory if a system start is initiated; and
omitting the step of loading the extended system image file, as the volatile memory already contains the extended system image file,
wherein the step of loading occurs only if the extended system image file is not already loaded onto the first computing device,
wherein the step of running the sign-on function and the step of displaying the sign-on window overlap in time with the step of loading, if the step of loading occurs.

13. The machine-readable storage medium of claim 1,
wherein the first computing device comprises a non-volatile memory and a volatile memory, wherein the volatile memory is the memory,
wherein the non-volatile memory comprises one or both of a basic input/output system (BIOS) and the base system image file.

14. A computing device comprising the first processing system and the machine-readable storage medium of claim 1.

15. A computing device, comprising:
a first processing system;
a memory;
means for facilitating executing, from the memory of the computing device, a base system image file of a system, wherein the base system image file and an extended system image file of the system are built from a single executable system image file of the system, wherein the base system image file comprises a first set of functions of an operating system, wherein the extended system image file comprises a second set of functions of the operating system, wherein the base system image file resides in the computing device during facilitating executing the base system image file;
means for facilitating initializing components of the computing device;
means for loading the extended system image file; and
means for facilitating executing the extended system image file from the computing device without booting the computing device between loading the extended system image file and executing the extended system image file, wherein the facilitating executing the extended system image file is to occur after the loading.

16. A method for facilitating split booting, comprising:
executing, from a memory of a first computing device, a base system image file of a system, wherein the base system image file and an extended system image file of the system are built from a single executable system image file of the system, wherein the base system image file comprises a first set of functions of an operating system, wherein the extended system image file comprises a second set of functions of the operating system, wherein the base system image file resides in the first computing device during the step of executing the base system image file;
initializing components of the first computing device;
loading the extended system image file; and
executing the extended system image file from the first computing device without booting the first computing device between the step of loading the extended system image file and the step of executing the extended system image file, wherein the step of executing the extended system image file occurs after the step of loading.

17. A method for building system images to facilitate split booting, comprising:
building, as a single executable file, a system image file of a system,
wherein the system image file comprises a base portion and an extended portion,
wherein the base portion comprises a first set of functions of an operating system, wherein the first set of functions of the operating system comprises basic operating system functions, networking system functions, functions for abstracting and managing drawing objects, and a sign-on function,
wherein the extended portion comprises a second set of functions of the operating system and one or more applications; and
dividing the system image file into a base system image file and an extended system image file, wherein the base system image file comprises the base portion, and the extended system image file comprises the extended portion.

18. The method of claim 17, further comprising:
copying the base system image file onto a non-volatile memory of a first computing device, and
copying the extended system image file onto a second computing device, to be loaded to the first computing device at a later time.

19. The method of claim 17, wherein the non-volatile memory comprises a basic input/output system (BIOS).

20. The method of claim 17, wherein the system image file consists of the base portion and the extended portion, the base system image file consists of the base portion, the extended system image file consists of the extended portion, and the second set of functions of the operating system consists of the remaining functions of the operating system.

21. The method of claim 17,
wherein the system consists of a plurality of functions,
wherein the plurality of functions comprise the first set of functions of the operating system, the second set of functions of the operating system and the one or more applications,
wherein the step of building comprises:
compiling the plurality of functions of the system; and
linking the plurality of functions of the system,
wherein the base system image file and the extended system image file are linked together,
wherein the base system image file comprises functions to initialize hardware and software operating environment.

22. The method of claim 17,
wherein the method is performed at a computing build device,
wherein the computing build device comprises a memory and a processing system,
wherein the step of building comprises building the system image file of the system onto the memory of the computing build device,
wherein the step of dividing is performed by the processing system,
wherein the base system image file and the extended system image file are placed onto the memory.

* * * * *